US012750257B2

(12) United States Patent
Medeiros et al.

(10) Patent No.: US 12,750,257 B2
(45) Date of Patent: Sep. 29, 2026

(54) RADIO RECEIVER DEVICE WITH A NEURAL NETWORK, AND RELATED METHODS AND COMPUTER PROGRAMS

(71) Applicant: Nokia Solutions and Networks Oy, Espoo (FI)

(72) Inventors: Luiz Fernando Medeiros, Espoo (FI); Milan Zivkovic, Stuttgart (DE)

(73) Assignee: Nokia Solutions and Networks Oy, Espoo (FI)

( * ) Notice: Subject to any disclaimer, the term of this patent is extended or adjusted under 35 U.S.C. 154(b) by 278 days.

(21) Appl. No.: 18/717,870

(22) PCT Filed: Dec. 10, 2021

(86) PCT No.: PCT/EP2021/085210
§ 371 (c)(1),
(2) Date: Jun. 7, 2024

(87) PCT Pub. No.: WO2023/104317
PCT Pub. Date: Jun. 15, 2023

(65) Prior Publication Data

US 2025/0062936 A1 Feb. 20, 2025

(51) Int. Cl.
*H04L 25/02* (2006.01)
*H04L 5/00* (2006.01)

(52) U.S. Cl.
CPC ........ *H04L 25/0254* (2013.01); *H04L 5/0051* (2013.01); *H04L 25/0224* (2013.01)

(58) Field of Classification Search
CPC ............... H04L 25/0254; H04L 5/0051; H04L 25/0224; H04L 25/022; H04L 27/2601;
(Continued)

(56) References Cited

U.S. PATENT DOCUMENTS 10,305,553 B2 5/2019 O'Shea et al.
2020/0343985 A1* 10/2020 O'Shea .................. G06N 3/082
(Continued)

FOREIGN PATENT DOCUMENTS

CN 111884976 B 9/2021
WO 2020/092391 A1 5/2020

OTHER PUBLICATIONS

Ye et al., "Power of Deep Learning for Channel Estimation and Signal Detection in OFDM Systems", IEEE Wireless Communications Letters, vol. 7, No. 1, Feb. 2018, pp. 114-117.
(Continued)

*Primary Examiner* — Hashim S Bhatti
(74) *Attorney, Agent, or Firm* — Nokia Technologies Oy

(57) ABSTRACT

Radio receiver devices and related methods and computer programs are disclosed. A radio signal comprising a pilot signal is received at a radio receiver device over a radio channel. Raw channel estimation of the radio channel is performed based on the received pilot signal, thereby obtaining a raw channel estimate. The raw channel estimate is processed. The processing of the raw channel estimate comprises applying a neural network, NN, to the raw channel estimate. The NN comprises at least one fully connected layer and at least one convolutional layer. The NN is executable to encode the raw channel estimate by mapping the raw channel estimate into an alternate domain, thereby obtaining an encoded channel estimate. The NN is further executable to decode the encoded channel estimate by mapping the encoded channel estimate to a frequency-interpolated channel estimate.

20 Claims, 14 Drawing Sheets

(58) Field of Classification Search
CPC .............. H04L 25/0232; G06N 3/0455; G06N 3/0464; G06N 3/084
See application file for complete search history.

(56) References Cited

U.S. PATENT DOCUMENTS

| | | | | |
|---|---|---|---|---|
| 2021/0021307 | A1* | 1/2021 | Shattil | H04W 72/046 |
| 2024/0072927 | A1* | 2/2024 | Xiao | H04L 25/0254 |
| 2024/0320488 | A1* | 9/2024 | Sun | G06N 3/0464 |
| 2024/0413867 | A1* | 12/2024 | Hao | H04B 7/0478 |
| 2025/0007583 | A1* | 1/2025 | Chi | H04W 72/12 |

OTHER PUBLICATIONS

Soltani et al., "Deep Learning-Based Channel Estimation", IEEE Communications Letters, vol. 23, No. 4, Apr. 2019, pp. 652-655.
Marinberg et al., "A Study on MIMO Channel Estimation by 2D and 3D Convolutional Neural Networks", IEEE International Conference on Advanced Networks and Telecommunications Systems (ANTS), Dec. 14-17, 2020, 6 pages.
"5GMax-5G New Radio Algorithm Specification", Nokia, 2019, pp. 1-426.
Goodfellow et al., "Deep Learning", MIT Press, 2017, 801 pages.
Boyd et al., "Convex Optimization", Cambridge University Press, 2004, 714 pages.
Kingma et al., "Adam: A method for stochastic optimization", arXiv, Jan. 30, 2017, pp. 1-15.
"HuberLoss", PyTorch, Retrieved on Jun. 30, 2024, Webpage available at : https://pytorch.org/docs/stable/generated/torch.nn.HuberLoss.html.
"Torch.autograd.backward", PyTorch, Retrieved on Jun. 30, 2024, Webpage available at : https://pytorch.org/docs/stable/generated/torch.autograd.backward.html#torch.autograd.backward.
International Search Report and Written Opinion received for corresponding Patent Cooperation Treaty Application No. PCT/EP2021/085210, dated Jul. 25, 2022, 20 pages.
Chen et al., "DecNet-CNN Framework for Channel Estimation", 2nd International Conference on Artificial Intelligence and Information Systems, May 20, 5 pages.
Liu et al., "RecNet: Deep Learning-Based OFDM Receiver with Semi-Blind Channel Estimation", IEEE International Symposium on Circuits and Systems (ISCAS), Oct. 12-14, 2020, 4 pages.
Wada et al., "A Denoising Autoencoder based wireless channel transfer function estimator for OFDM communication system", International Conference on Artificial Intelligence in Information and Communication (ICAIIC), Feb. 11-13, 2019, pp. 530-533.
"Convolutional neural network", Wikipedia, Retrieved on Jun. 30, 2024, Webpage available at : https://en.wikipedia.org/wiki/Convolutional_neural_network.
"Regularization (mathematics)", Wikipedia, Retrieved on Jun. 30, 2024, Webpage available at : https://en.wikipedia.org/wiki/Regularization_(mathematics).
"Stochastic gradient descent", Wikipedia, Retrieved on Jun. 30, 2024, Webpage available at : https://en.wikipedia.org/wiki/Stochastic_gradient_descent.
Zhao et al., "Deep-Waveform: A Learned OFDM Receiver Based on Deep Complex-valued Convolutional Networks", arXiv, Mar. 19, 2021, pp. 1-13.

* cited by examiner

600

RADIO RECEIVER DEVICE WITH A NEURAL NETWORK, AND RELATED METHODS AND COMPUTER PROGRAMS

RELATED APPLICATION

This application claims benefit of priority from International Patent App. No. PCT/EP2021/085210, filed Dec. 10, 2021, the disclosure of which is hereby incorporated in its entirety by reference herein.

TECHNICAL FIELD

The disclosure relates generally to communications and, more particularly but not exclusively, to a radio receiver device with a neural network, as well as related methods and computer programs.

BACKGROUND

In wireless communication, reliable and efficient detection of transmitted data depends on accurate representation of the communication channel. Once the communication channel is estimated, the obtained estimates may be used, e.g., for equalization of received symbols. Moreover, in massive multiple-input multiple-output (MIMO) systems, besides data detection, channel estimation may be used, e.g., for calculation of beamforming coefficients.

Accordingly, channel estimation is an important part of establishing communications in wireless communication systems. Additionally, with the rise of massive MIMO techniques having sparse pilot structures supposed to support many layers and large antenna configurations, it becomes even more important to establish accurate channel estimation.

However, at least in some situations, current channel estimation implementations may be sub-optimal and provide a significant performance drop in complex channels. Additionally, at least in some situations the current implementations may not consider information that is captured across antennas (such as correlation), and resource blocks.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a radio receiver device comprises at least one processor, and at least one memory including computer program code. The at least one memory and the computer program code are configured to, with the at least one processor, cause the radio receiver device at least to perform: receiving a radio signal comprising a pilot signal, over a radio channel; performing raw channel estimation of the radio channel based on the received pilot signal, thereby obtaining a raw channel estimate; and processing the raw channel estimate. The processing of the raw channel estimate comprises applying a neural network, NN, to the raw channel estimate. The NN comprises at least one fully connected layer and at least one convolutional layer. The NN is executable to encode the raw channel estimate by mapping the raw channel estimate into an alternate domain, thereby obtaining an encoded channel estimate. The NN is further executable to decode the encoded channel estimate by mapping the encoded channel estimate to a frequency-interpolated channel estimate.

In an example embodiment, alternatively or in addition to the above-described example embodiments, the at least one memory and the computer program code are further configured to, with the at least one processor, cause the radio receiver device to perform applying pre-processing on the raw channel estimate before the applying of the NN, the pre-processing comprising at least one of:

- mapping a three-dimensional complex-valued raw channel estimate to a four-dimensional real-valued raw channel estimate by extracting respective real and imaginary components;
- separating the four-dimensional real-valued raw channel estimate into real-valued raw channel estimates for each single transmit antenna and single receive antenna pair; or
- reshaping the separated real-valued raw channel estimates to an input dimension of the NN.

In an example embodiment, alternatively or in addition to the above-described example embodiments, the at least one memory and the computer program code are further configured to, with the at least one processor, cause the radio receiver device to perform applying post-processing on the frequency-interpolated channel estimate after the applying of the NN, the post-processing comprising at least one of:

- reshaping an output dimension of the NN to real-valued frequency-interpolated channel estimates for each single transmit antenna and single receive antenna pair;
- concatenating the real-valued frequency-interpolated channel estimates for each single transmit antenna and single receive antenna pair to a four-dimensional real-valued frequency-interpolated channel estimate; or
- mapping the four-dimensional real-valued frequency-interpolated channel estimate to a three-dimensional complex-valued frequency-interpolated channel estimate.

In an example embodiment, alternatively or in addition to the above-described example embodiments, the pilot signal comprises a single demodulation reference signal, DMRS, in a slot.

In an example embodiment, alternatively or in addition to the above-described example embodiments, the pilot signal comprises multiple DMRSs in a slot.

In an example embodiment, alternatively or in addition to the above-described example embodiments, separate inference is performed for each DMRS of the multiple DMRSs.

In an example embodiment, alternatively or in addition to the above-described example embodiments, joint inference is performed for each DMRS of the multiple DMRSs.

In an example embodiment, alternatively or in addition to the above-described example embodiments, the at least one memory and the computer program code are further configured to, with the at least one processor, cause the radio receiver device to perform training the NN by performing dataset augmentation via at least one of: statistical insertion of noise, additional passes of data, passing over same data multiple times and randomly picking samples, or zero padding.

In an example embodiment, alternatively or in addition to the above-described example embodiments, the training of the NN further comprises a regularization of a loss function.

In an example embodiment, alternatively or in addition to the above-described example embodiments, the training of the NN further comprises a statistical momentum-based optimization.

In an example embodiment, alternatively or in addition to the above-described example embodiments, the at least one memory and the computer program code are further configured to, with the at least one processor, cause the radio receiver device to perform providing at least one of a signal-to-noise ratio, SNR, of the raw channel estimate or an inverse fast Fourier transform, IFFT, of the raw channel estimate to the NN.

In an example embodiment, alternatively or in addition to the above-described example embodiments, the radio channel comprises a physical downlink shared channel, PDSCH, a physical uplink shared channel, PUSCH, a physical downlink control channel, PDCCH, or a physical broadcast channel, PBCH.

In an example embodiment, alternatively or in addition to the above-described example embodiments, the received radio signal comprises an orthogonal frequency-division multiplexing, OFDM, radio signal.

In an example embodiment, alternatively or in addition to the above-described example embodiments, the radio receiver device comprises a multiple-input and multiple-output, MIMO, capable radio receiver device.

An example embodiment of a radio receiver device comprises means for performing: causing the radio receiver device to receive a radio signal comprising a pilot signal, over a radio channel; performing raw channel estimation of the radio channel based on the received pilot signal, thereby obtaining a raw channel estimate; and processing the raw channel estimate. The processing of the raw channel estimate comprises applying a neural network, NN, to the raw channel estimate. The NN comprises at least one fully connected layer and at least one convolutional layer. The NN is executable to encode the raw channel estimate by mapping the raw channel estimate into an alternate domain, thereby obtaining an encoded channel estimate. The NN is further executable to decode the encoded channel estimate by mapping the encoded channel estimate to a frequency-interpolated channel estimate.

In an example embodiment, alternatively or in addition to the above-described example embodiments, the means are further configured to perform applying pre-processing on the raw channel estimate before the applying of the NN, the pre-processing comprising at least one of:

- mapping a three-dimensional complex-valued raw channel estimate to a four-dimensional real-valued raw channel estimate by extracting respective real and imaginary components;
- separating the four-dimensional real-valued raw channel estimate into real-valued raw channel estimates for each single transmit antenna and single receive antenna pair; or
- reshaping the separated real-valued raw channel estimates to an input dimension of the NN.

In an example embodiment, alternatively or in addition to the above-described example embodiments, the means are further configured to perform applying post-processing on the frequency-interpolated channel estimate after the applying of the NN, the post-processing comprising at least one of:

- reshaping an output dimension of the NN to real-valued frequency-interpolated channel estimates for each single transmit antenna and single receive antenna pair;
- concatenating the real-valued frequency-interpolated channel estimates for each single transmit antenna and single receive antenna pair to a four-dimensional real-valued frequency-interpolated channel estimate; or
- mapping the four-dimensional real-valued frequency-interpolated channel estimate to a three-dimensional complex-valued frequency-interpolated channel estimate.

In an example embodiment, alternatively or in addition to the above-described example embodiments, the pilot signal comprises a single demodulation reference signal, DMRS, in a slot.

In an example embodiment, alternatively or in addition to the above-described example embodiments, the pilot signal comprises multiple DMRSs in a slot.

In an example embodiment, alternatively or in addition to the above-described example embodiments, separate inference is performed for each DMRS of the multiple DMRSs.

In an example embodiment, alternatively or in addition to the above-described example embodiments, joint inference is performed for each DMRS of the multiple DMRSs.

In an example embodiment, alternatively or in addition to the above-described example embodiments, the means are further configured to perform training the NN by performing dataset augmentation via at least one of: statistical insertion of noise, additional passes of data, passing over same data multiple times and randomly picking samples, or zero padding.

In an example embodiment, alternatively or in addition to the above-described example embodiments, the training of the NN further comprises a regularization of a loss function.

In an example embodiment, alternatively or in addition to the above-described example embodiments, the training of the NN further comprises a statistical momentum-based optimization.

In an example embodiment, alternatively or in addition to the above-described example embodiments, the means are further configured to perform providing at least one of a signal-to-noise ratio, SNR, of the raw channel estimate or an inverse fast Fourier transform, IFFT, of the raw channel estimate to the NN.

In an example embodiment, alternatively or in addition to the above-described example embodiments, the radio channel comprises a physical downlink shared channel, PDSCH, a physical uplink shared channel, PUSCH, a physical downlink control channel, PDCCH, or a physical broadcast channel, PBCH.

In an example embodiment, alternatively or in addition to the above-described example embodiments, the received radio signal comprises an orthogonal frequency-division multiplexing, OFDM, radio signal.

In an example embodiment, alternatively or in addition to the above-described example embodiments, the radio receiver device comprises a multiple-input and multiple-output, MIMO, capable radio receiver device.

An example embodiment of a method comprises: receiving, at a radio receiver device, a radio signal comprising a pilot signal, over a radio channel; performing, by the radio receiver device, raw channel estimation of the radio channel based on the received pilot signal, thereby obtaining a raw channel estimate; and processing, by the radio receiver device, the raw channel estimate. The processing of the raw channel estimate comprises applying a neural network, NN, to the raw channel estimate. The NN comprises at least one fully connected layer and at least one convolutional layer. The NN is executable to encode the raw channel estimate by mapping the raw channel estimate into an alternate domain, thereby obtaining an encoded channel estimate. The NN is further executable to decode the encoded channel estimate by mapping the encoded channel estimate to a frequency-interpolated channel estimate.

In an example embodiment, alternatively or in addition to the above-described example embodiments, the method further comprises applying, by the radio receiver device, pre-processing on the raw channel estimate before the applying of the NN, the pre-processing comprising at least one of:

mapping a three-dimensional complex-valued raw channel estimate to a four-dimensional real-valued raw channel estimate by extracting respective real and imaginary components;

separating the four-dimensional real-valued raw channel estimate into real-valued raw channel estimates for each single transmit antenna and single receive antenna pair; or reshaping the separated real-valued raw channel estimates to an input dimension of the NN.

In an example embodiment, alternatively or in addition to the above-described example embodiments, the method further comprises applying, by the radio receiver device, post-processing on the frequency-interpolated channel estimate after the applying of the NN, the post-processing comprising at least one of:

reshaping an output dimension of the NN to real-valued frequency-interpolated channel estimates for each single transmit antenna and single receive antenna pair;

concatenating the real-valued frequency-interpolated channel estimates for each single transmit antenna and single receive antenna pair to a four-dimensional real-valued frequency-interpolated channel estimate; or mapping the four-dimensional real-valued frequency-interpolated channel estimate to a three-dimensional complex-valued frequency-interpolated channel estimate.

In an example embodiment, alternatively or in addition to the above-described example embodiments, the pilot signal comprises a single demodulation reference signal, DMRS, in a slot.

In an example embodiment, alternatively or in addition to the above-described example embodiments, the pilot signal comprises multiple DMRSs in a slot.

In an example embodiment, alternatively or in addition to the above-described example embodiments, separate inference is performed for each DMRS of the multiple DMRSs.

In an example embodiment, alternatively or in addition to the above-described example embodiments, joint inference is performed for each DMRS of the multiple DMRSs.

In an example embodiment, alternatively or in addition to the above-described example embodiments, the method further comprises training, by the radio receiver device, the NN by performing dataset augmentation via at least one of: statistical insertion of noise, additional passes of data, passing over same data multiple times and randomly picking samples, or zero padding.

In an example embodiment, alternatively or in addition to the above-described example embodiments, the training of the NN further comprises a regularization of a loss function.

In an example embodiment, alternatively or in addition to the above-described example embodiments, the training of the NN further comprises a statistical momentum-based optimization.

In an example embodiment, alternatively or in addition to the above-described example embodiments, the method further comprises providing, by the radio receiver device, at least one of a signal-to-noise ratio, SNR, of the raw channel estimate or an inverse fast Fourier transform, IFFT, of the raw channel estimate to the NN.

In an example embodiment, alternatively or in addition to the above-described example embodiments, the radio channel comprises a physical downlink shared channel, PDSCH, a physical uplink shared channel, PUSCH, a physical downlink control channel, PDCCH, or a physical broadcast channel, PBCH.

In an example embodiment, alternatively or in addition to the above-described example embodiments, the received radio signal comprises an orthogonal frequency-division multiplexing, OFDM, radio signal.

In an example embodiment, alternatively or in addition to the above-described example embodiments, the radio receiver device comprises a multiple-input and multiple-output, MIMO, capable radio receiver device.

An example embodiment of a computer program comprises instructions for causing a radio receiver device to perform at least the following: receiving a radio signal comprising a pilot signal, over a radio channel; performing raw channel estimation of the radio channel based on the received pilot signal, thereby obtaining a raw channel estimate; and processing the raw channel estimate. The processing of the raw channel estimate comprises applying a neural network, NN, to the raw channel estimate. The NN comprises at least one fully connected layer and at least one convolutional layer. The NN is executable to encode the raw channel estimate by mapping the raw channel estimate into an alternate domain, thereby obtaining an encoded channel estimate. The NN is further executable to decode the encoded channel estimate by mapping the encoded channel estimate to a frequency-interpolated channel estimate.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
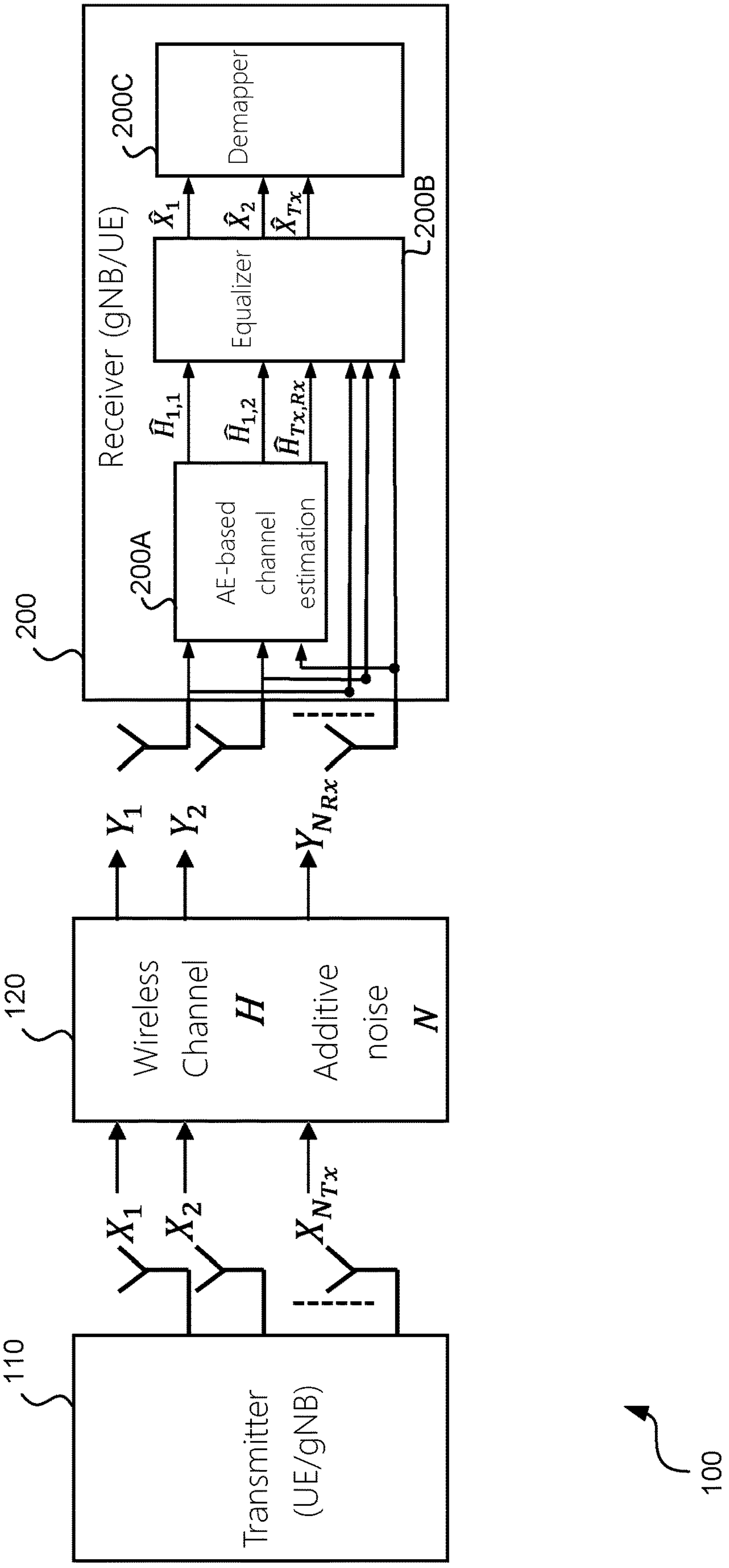
FIG. 1 shows an example embodiment of the subject matter described herein illustrating an example system, where various embodiments of the present disclosure may be implemented.

FIG. 1 illustrates an example system 100, where various embodiments of the present disclosure may be implemented. The system 100 may comprise a fifth generation (5G) new radio (NR) network. An example representation of the system 100 is shown depicting a radio transmitter device 110 (comprised in, e.g., a client device or a network node device) and a radio receiver device 200 (comprised in, e.g., a network node device or a client device, respectively), as well as a radio channel 120 over which the radio transmitter device 110 and the radio receiver device 200 communicate. At least in some embodiments, the 5G NR network may comprise one or more massive machine-to-machine (M2M) network(s), massive machine type communications (mMTC) network(s), internet of things (IoT) network(s), industrial internet-of-things (IIoT) network(s), enhanced mobile broadband (eMBB) network(s), ultra-reliable low-latency communication (URLLC) network(s), and/or the like. In other words, the 5G NR network may be configured to serve diverse service types and/or use cases, and it may logically be seen as comprising one or more networks.

A client device may include, e.g., a mobile phone, a smartphone, a tablet computer, a smart watch, or any hand-held, portable and/or wearable device. A client device may also be referred to as a user equipment (UE). A network node device may be a base station. A base station may include, e.g., a fifth-generation base station (gNB) or any such device suitable for providing an air interface for client devices to connect to a wireless network via wireless transmissions.

More specifically, FIG. 1 illustrates an example uplink (UL) single-user multiple-input multiple-output (SU-MIMO) system in which a network node device, equipped with $N_{Rx}$ antennas, receives signals transmitted from $N_{Tx}$ antennas of a client device. An extension of the SU-MIMO system 100 of FIG. 1 to a multi-user MIMO (MU-MIMO) system may be achieved, e.g., by letting the $N_{Tx}$ antennas be distributed among different client devices.

A transmitted signal X may be impaired by the effects of the wireless channel H and additive noise N, such that a received signal Y may have to be further processed to correctly decode the transmitted data. An objective of a channel estimator 200A is to provide a channel estimate $\hat{H}$ to an equalizer 200B, which produces a transmitted signal estimate $\hat{X}$, to be further demapped by a demapper 200C, and decoded.

Figure 2:
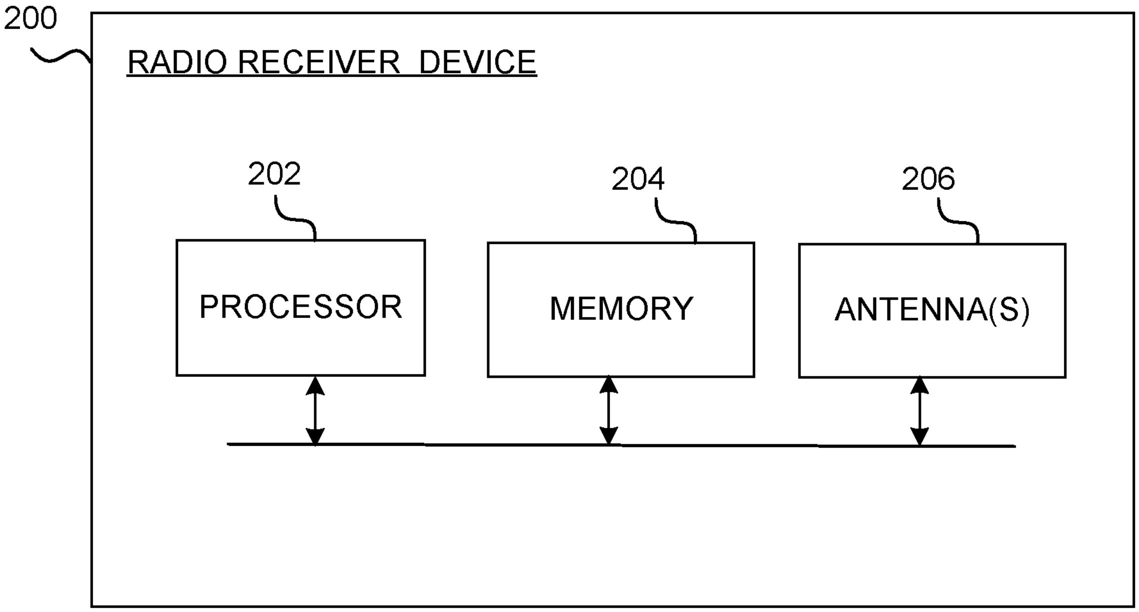
FIG. 2 shows an example embodiment of the subject matter described herein illustrating a radio receiver device.

The channel estimator 200A, the equalizer 200B, and/or the demapper 200C can, for example, be implemented with the at least one processor 202 and the at least one memory 204 of FIG. 2.

For example, the radio receiver device 200 may estimate the channel 120 using dedicated pilot sequences with a predetermined value and position in time-frequency, known both to the radio transmitter device 110 and the radio receiver device 200. For example, demodulation reference symbols (DMRS) may be used for channel estimation for data detection, while sounding reference symbols (SRS) and channel-state information reference signals (CSI-RS) may be used to estimate corresponding beamforming coefficients.

As will be described in more detail below, at least in some embodiments, a neural network (NN) may be applied to a raw (least square) channel estimate which is a product of a received pilot sequence and a Hermitian of a transmitted sequence for a given pilot structure, i.e., $$\widetilde{H_P} = X_P^H Y_P.$$

First encoded into an alternate domain (e.g., defined by an encoder during a training process), the alternative sequence may then be mapped back to a frequency-interpolated version (i.e., decoded) of the estimated channel, i.e., $\hat{H} = AE(\widetilde{H_P})$.

At least in some embodiments, the disclosure may be able to capture a complex-valued channel realization out of input data, and produce accurate channel estimates in various wireless conditions.

While some of the following examples focus on a physical uplink shared channel (PUSCH) channel, in general the disclosure may be applied to any physical channel that utilizes a DMRS for channel estimation, both in uplink direction (e.g., a physical uplink control channel (PUCCH)) and downlink (e.g., a physical downlink shared channel (PDSCH), a physical downlink control channel (PDCCH), or a physical broadcast channel, PBCH)) direction. Moreover, the disclosure may be applied to channel estimation based on a synchronization signal, such as an SRS, a CSI-RS, and/or a phase tracking reference signal (PTRS).

In the following, various example embodiments will be discussed. At least some of these example embodiments may allow applying a neural network (NN), comprising one or more fully connected layers and one or more convolutional neural network layers, to produce an output which minimizes a mean squared error between an ideal output for a given scenario and a realized output.

FIG. 2 is a block diagram of the radio receiver device 200, in accordance with an example embodiment.

The radio receiver device 200 comprises one or more processors 202 and one or more memories 204 that comprise computer program code. The radio receiver device 200 may be configured to receive information from other devices. In one example, the radio receiver device 200 may receive signalling information and data in accordance with at least one cellular communication protocol. The radio receiver device 200 may be configured to provide at least one wireless radio connection, such as for example a 3GPP mobile broadband connection (e.g., 5G). The radio receiver device 200 may comprise, or be configured to be coupled to, at least one antenna 206 to receive radio frequency signals.

Although the radio receiver device 200 is depicted to include only one processor 202, the radio receiver device 200 may include more processors. In an embodiment, the memory 204 is capable of storing instructions, such as an operating system and/or various applications. Furthermore, the memory 204 may include a storage that may be used to store, e.g., at least some of the information and data used in the disclosed embodiments, such as the NN described in more detail below.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network chip, an artificial intelligence (AI) accelerator, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

It is also possible to train one machine learning model with a specific architecture, then derive another machine learning model from that using processes such as compilation, pruning, quantization or distillation. The machine learning model can be executed using any suitable apparatus, for example a CPU, GPU, ASIC, FPGA, compute-in-memory, analogue, or digital, or optical apparatus. It is also possible to execute the machine learning model in an apparatus that combines features from any number of these, for instance digital-optical or analogue-digital hybrids. In some examples, the weights and required computations in these systems may be programmed to correspond to the machine learning model. In some examples, the apparatus may be designed and manufactured so as to perform the task defined by the machine learning model so that the apparatus is configured to perform the task when it is manufactured without the apparatus being programmable as such.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The radio receiver device 200 may comprise any of various types of digital devices capable of receiving radio communication in a wireless network. At least in some embodiments, the radio receiver device 200 may be comprised in a base station, such as a fifth-generation base station (gNB) or any such device providing an air interface for client devices to connect to the wireless network via wireless transmissions. At least in some embodiments, the radio receiver device 200 may comprise a multiple-input and multiple-output (MIMO) capable radio receiver device, such as a massive MIMO capable radio receiver device.

The at least one memory 204 and the computer program code are configured to, with the at least one processor 202, cause the radio receiver device 200 to at least perform receiving a radio signal comprising a pilot signal, over a radio channel. For example, the received radio signal may comprise an orthogonal frequency-division multiplexing (OFDM) radio signal. For example, the radio channel may comprise a physical downlink shared channel (PDSCH), a physical uplink shared channel (PUSCH), a physical downlink control channel, PDCCH, or a physical broadcast channel (PBCH). At least in some embodiments, the pilot signal may comprise a single demodulation reference signal (DMRS) in a slot, or the pilot signal may comprise multiple DMRSs in a slot.

For example, in the radio receiver device 200, when equipped with $N_{Rx}$ antennas, after a fast Fourier transform (FFT) operation, a received frequency-domain signal Y occupying F subcarriers on a single OFDM symbol ($Y \in \mathbb{C}^{N_F \times N_{Rx}}$) may be given as:

$$Y = HX + N,$$

where $X \in \mathbb{C}^{N_F \times N_{Tx}}$ is the transmitted signal, $H \in \mathbb{C}^{N_F \times N_{Rx} \times N_{Tx}}$ is a communication channel matrix, and $N \in \mathbb{C}^{N_F \times N_{Rx}}$ is additive Gaussian noise. The communication channel matrix H between a transmitting antenna $t \in \{1, \ldots, N_{Tx}\}$, and a receiving antenna $r \in \{1, \ldots, N_{Rx}\}$, may be written as $[\hat{H}]_{r,t}$.

The at least one memory 204 and the computer program code are further configured to, with the at least one processor 202, cause the radio receiver device 200 to perform raw channel estimation of the radio channel based on the received pilot signal, thereby obtaining a raw channel estimate.

Figure 3B:
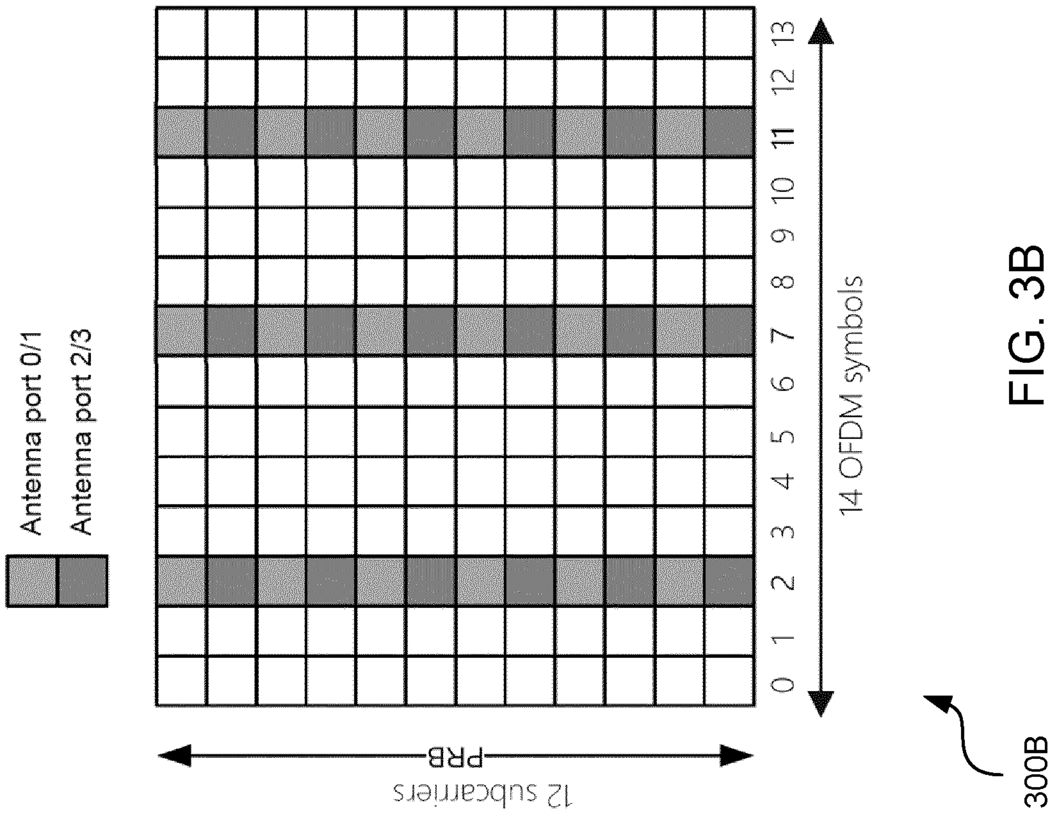
FIG. 3B illustrates an example of a physical resource block time-frequency structure comprising three demodulation reference symbols.
Figure 3A:
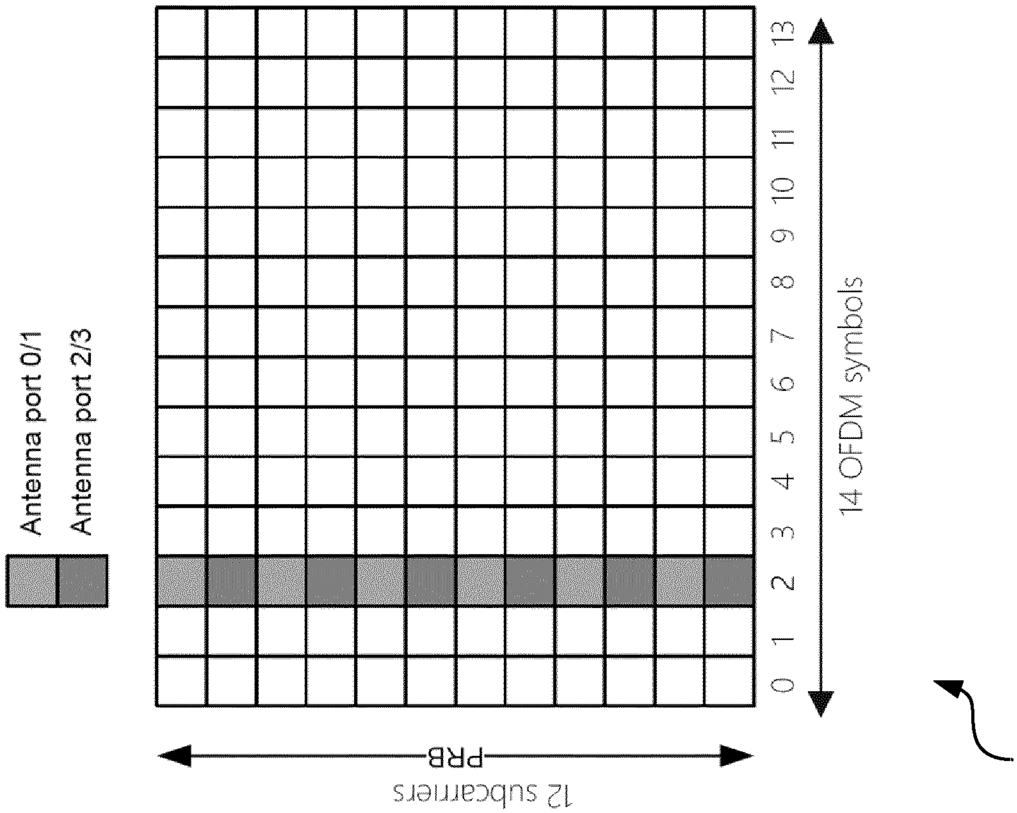
FIG. 3A illustrates an example of a physical resource block time-frequency structure comprising one demodulation reference symbol.

The goal of the channel estimation is to produce channel estimates $\hat{H}$, necessary for the equalization of received $\hat{Y}$. The estimation may be based pilot signals $X_p$, such as DMRSs, given as random sequences initialized by system parameters (such as a cell identifier (Cell ID), a frame and slot number, a radio network temporary identifier (RNTI), and/or a user identifier). Here, $p \in P$, where P denotes the set of DMRS time indices within a slot, and p denotes the DMRS time index within a slot belonging to set P. The number of DMRS symbols in a slot may be reconfigurable by radio resource management (RRM), e.g., up to four. Diagram 300A of FIG. 3*a* illustrates a slot structure comprising one DMRS symbol in which p=2, while diagram 300B of FIG. 3*b* illustrates a slot structure comprising three DMRS symbol in which p={2,7,11}.

For the description of the NN below, the single DMRS case shown FIG. 3*a* will be used as an example. Here, it is assumed that a channel estimate on a transmitted pilot ($\widetilde{\boldsymbol{H}_P}$) approximates well channel estimates on other (data) symbols within the slot (white fields), therefore $\hat{H} \approx \widetilde{\boldsymbol{H}_P}$. In the case of multiple DMRS symbols in a slot, such as the one shown in FIG. 3*b*, various interpolation methods may be used to approximate the estimates on data (non-pilot) symbols.

Accordingly, raw channel estimation, $$\tilde{H}_p = X_P^H Y_p,$$

is performed on pilot symbols. However, the raw channel estimates may comprise a strong noise component in a low signal-to-noise ratio (SNR) region. The effect of the noise may be reduced or mitigated by applying smoothening to the raw channel estimates. The application of the NN described below may provide such smoothening, among other things.

The at least one memory 204 and the computer program code are further configured to, with the at least one processor 202, cause the radio receiver device 200 to perform processing the raw channel estimate. The processing of the raw channel estimate comprises applying a neural network (NN) to the raw channel estimate. The NN comprises at least one fully connected layer and at least one convolutional layer. The NN is executable to encode the raw channel estimate by mapping the raw channel estimate into an alternate domain, thereby obtaining an encoded channel estimate. The NN is further executable to decode the encoded channel estimate by mapping the encoded channel estimate to a frequency-interpolated channel estimate.

The at least one memory 204 and the computer program code may be further configured to, with the at least one processor 202, cause the radio receiver device 200 to perform applying pre-processing on the raw channel estimate before the applying of the NN.

The at least one memory 204 and the computer program code may be further configured to, with the at least one processor 202, cause the radio receiver device 200 to perform applying post-processing on the frequency-interpolated channel estimate after the applying of the NN.

Figure 4A:
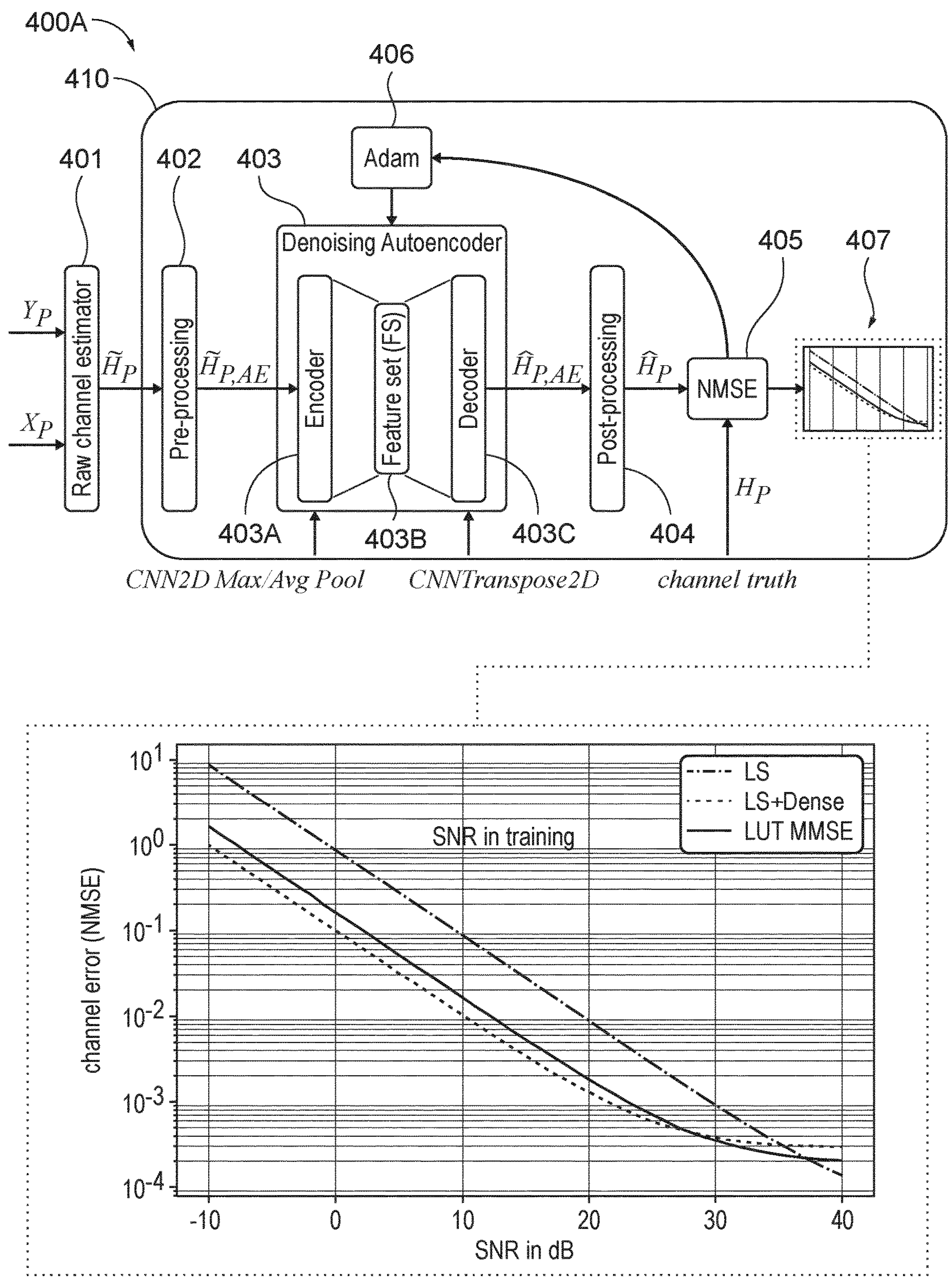
FIG. 4A shows an example embodiment of the subject matter described herein illustrating a trainable neural network architecture.
Figure 4B:
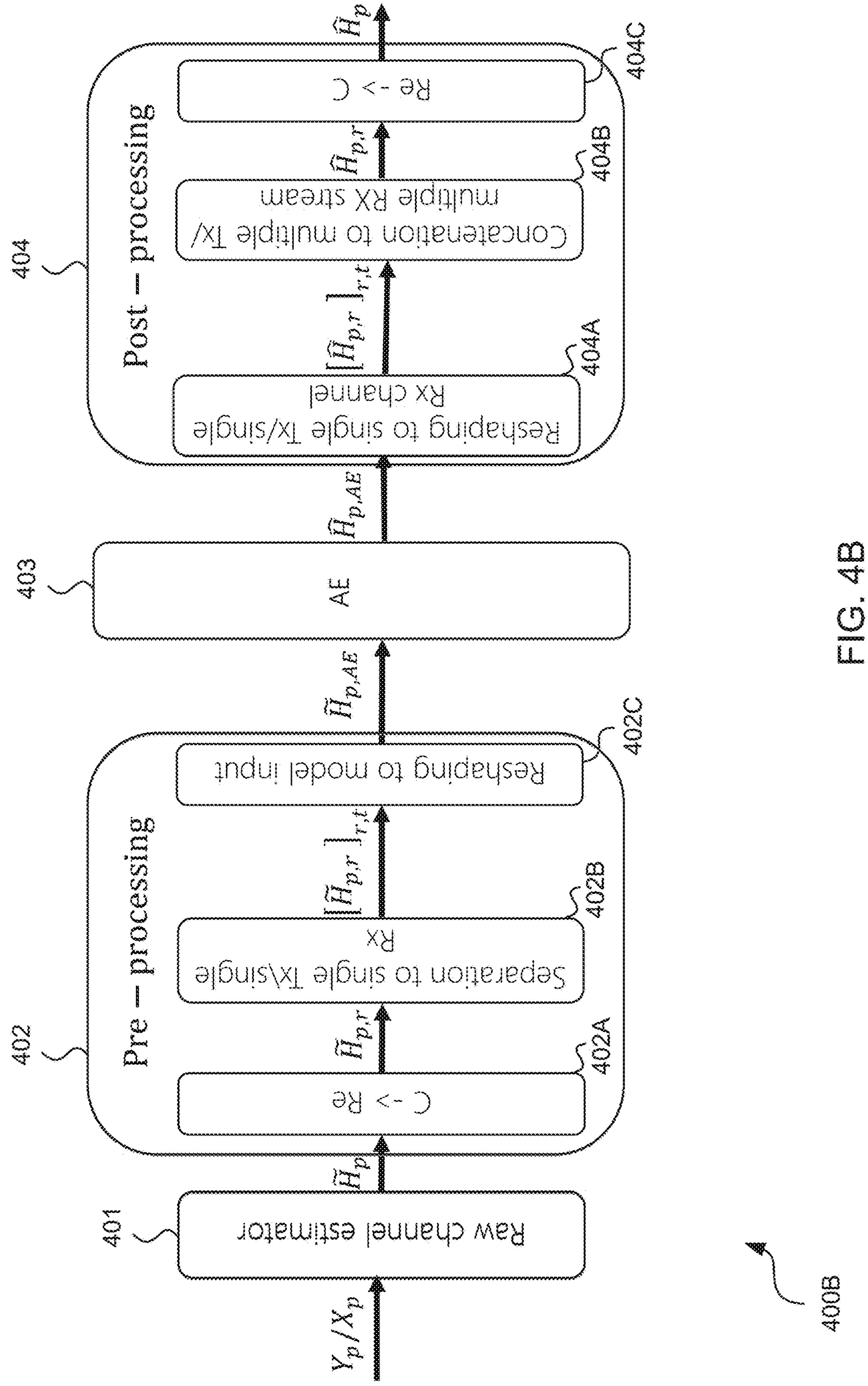
FIG. 4B shows an example embodiment of the subject matter described herein illustrating a more detailed view on trainable inference with pre- and post-processing blocks.

Diagram 400A of FIG. 4A illustrates an example of a trainable NN architecture in accordance with the disclosure, and diagram 400B of FIG. 4B illustrates a more detailed view on trainable inference with pre- and post-processing blocks. Diagram 400A includes a raw channel estimator 401 and a main block 410. The main block 410 includes a pre-processing block 402, the NN 403 (which may be based on a convolutional neural network (CNN) denoising auto-encoder), a post-processing block 404, a normalized mean square error (NMSE) block 405 that represents loss computation $\mathcal{L}_{NMSE}(\mathrm{H}_p, \hat{\mathrm{H}}_p)$ described in more detail below, an Adam optimizer block 406, and an output block 407. The NN 403 may comprise an encoder 403A (to perform the encoding of the raw channel estimate described above) and a decoder 403C (to perform the decoding of the encoded channel estimate described above).

CNN2D refers to a convolutional neural network block that produces a convolutional operation in a four-dimensional tensor (described in more detail below). This convolutional operation may comprise kernels and strides that consider computation of two-dimensional kernels with respect to two-dimensional strides and data matrices, whereby the data matrices are a portion of the input data $\tilde{\mathrm{H}}_p$.

CNNTranspose2D is similar to the CNN2D, except that the operation here is a transposed convolutional operation, and deconvolves the data.

MaxPool2D refers to a computation of a maximum for a two-dimensional kernel shape. This may be applied after the convolutional operation.

AvgPool2D refers to a computation of an average for a two-dimensional kernel shape. This may be applied after the convolutional operation.

Here, it is to be noted that either avgPool or max-Pool may be utilized.

A channel truth may be taken as an ideal channel estimate. In a simulated scenario or in a completely controlled environment, a channel profile is known. This real channel profile may be used to compare against an estimated channel. Then, the error is what is propagated to machine learning blocks.

Herein, the term Adam optimizer refers to an adaptive learning rate optimization algorithm that's been designed for training, e.g., deep neural networks. The result of the NMSE 405 calculation is a metric that is used by the Adam optimizer block 406. The Adam optimizer block 406 may contain the logic related to the optimization steps for machine learning model training. This may be linked with the backpropagation of the NMSE to the network and the weights and biases update of the machine learning model during training.

At least in some embodiments, the NN 403 may be trainable, and the pre-processing block 402 and/or the post-processing block 404 may be non-trainable.

Some or all of the elements of FIGS. 4A and 4B can, for example, be implemented with the at least one processor 202 and the at least one memory 204 of FIG. 2.

The pre-processing block 402 may map complex three-dimensional raw estimates $\tilde{\mathrm{H}}_p \in \mathbb{C}^{N_F \times N_{Rx} \times N_{Tx}}$ to real and reshaped four-dimensional raw channel estimates $\tilde{\mathrm{H}}_{p,AE} \in \mathrm{Re}^{[b_s, c_s, h_s, w_s]}$, as shown in FIG. 4B. Here, $[b_s, c_s, h_s, w_s]$ denotes the input dimension of the trainable NN 403, and is described in more detail below.

The pre-processing may comprise mapping (e.g., by block 402A of FIG. 4B) a three-dimensional complex-valued raw channel estimate to a four-dimensional real-valued raw channel estimate by extracting respective real and imaginary components. In other words, the pre-processing may comprise mapping the complex-valued three-dimensional raw estimates $\tilde{\mathrm{H}}_p$ to four-dimensional real-valued estimates by extracting the real and imaginary components: $\tilde{\mathrm{H}}_p \rightarrow \tilde{\mathrm{H}}_{p,r} \in \mathrm{Re}^{2 \times N_F \times N_{Rx} \times N_{Tx}}$, in which first dimension denotes real and imaginary component.

Additionally/alternatively, the pre-processing may comprise separating (e.g., by block 402B of FIG. 4B) the four-dimensional real-valued raw channel estimate into real-valued raw channel estimates for each single transmit antenna and single receive antenna pair. In other words, the pre-processing may comprise separating real raw estimates into several real-valued single transmitting (Tx) antenna t—single receiving (Rx) antenna r channel estimates: $\tilde{\mathrm{H}}_{p,real} \rightarrow [\tilde{\mathrm{H}}_{p,r}]_{r,t} \in \mathrm{Re}^{2 \times N_F}$, in which $t \in \{1, \ldots, N_{Tx}\}$, $r \in \{1, \ldots, N_{Rx}\}$.

Additionally/alternatively, the pre-processing may comprise reshaping (e.g., by block 402C of FIG. 4B) the separated real-valued raw channel estimates to an input dimension of the NN. In other words, the pre-processing may comprise reshaping $[\tilde{\mathrm{H}}_{p,r}]_{r,t} \in \mathrm{Re}^{2 \times N_F}$ to the input dimension of the trainable NN 403: $[\tilde{\mathrm{H}}_{p,r}]_{r,t} \rightarrow \tilde{\mathrm{H}}_{p,AE} \in \mathrm{Re}^{[b_s, c_s, h_s, w_s]}$.

Other pre-processing operations may also be possible.

The post-processing may comprise inverse operations (compared to the pre-processing), such as reshaping (e.g., by block 404A of FIG. 4B) an output dimension of the NN to real-valued frequency-interpolated channel estimates for each single transmit antenna and single receive antenna pair. In other words, the post-processing may comprise reshaping of the output dimension of the trainable NN 403 $\hat{\mathrm{H}}_{p,AE} \in \mathrm{Re}^{[b_s, c_s, h_s, 2*w_s]}$ to the single Tx antenna t—single Rx antenna r channel estimates: $\hat{\mathrm{H}}_{p,AE} \rightarrow [\hat{\mathrm{H}}_{p,r}]_{r,t} \in \mathrm{Re}^{2 \times 2*N_F}$.

Additionally/alternatively, the post-processing may comprise concatenating (e.g., by block 404B of FIG. 4B) the real-valued frequency-interpolated channel estimates for each single transmit antenna and single receive antenna pair to a four-dimensional real-valued frequency-interpolated channel estimate. In other words, the post-processing may comprise concatenating multiple single Tx antenna t—single Rx antenna r channel estimates to multiple streams: $[\hat{\mathrm{H}}_{p,r}]_{r,t} \rightarrow \hat{\mathrm{H}}_{p,r} \in \mathrm{Re}^{2 \times 2*N_F \times N_{Rx} \times N_{Tx}}$.

Additionally/alternatively, the post-processing may comprise mapping (e.g., by block 404C of FIG. 4B) the four-dimensional real-valued frequency-interpolated channel estimate to a three-dimensional complex-valued frequency-interpolated channel estimate. In other words, the post-processing may comprise mapping the $\hat{H}_{p,r}$ to the complex-valued estimates by grouping a pair of real-valued inputs into individual complex-valued numbers: $\hat{H}_{p,r} \rightarrow \hat{H}_p \in \mathbb{C}^{2*N_F \times N_{Rx} \times N_{Tx}}$.

As discussed above, the trainable NN 403 may comprise a neural network block 403A called encoder (En), to map the incoming data $\tilde{H}_{p,AE}$ into an alternate domain or feature set (FS) 403B that may better represent the input data for a subsequent block 403C called decoder (De), whose purpose is to decode this alternate feature mapping into an interpolated version of the channel estimates $\hat{H}_{p,AE}$. In order to achieve this, both NNs may be trained together, so an error $\in$ (i.e., the $\mathcal{L}_{NMSE}(H_p, \hat{H}_p)$ described in more detail below) may be computed by comparing the approximated channel estimates $\hat{H}_p$, while the error $\in$ is propagated back to both the decoder 403C and the encoder 403A.

The architecture illustrated in FIG. 4A may be further detailed as follows.

The input data $\tilde{H}_{p,AE}$ may represent raw channel estimates that may be grouped together in a tensor, the shape of which may be, e.g., as follows:

$[b_s, c_s, h_s, w_s]$ whereby:

b: $\{b_s, b_i\}$, c: $\{c_s, c_{imag}, c_{real}\}$, h: $\{h_s, h_i\}$, w: $\{w_s, w_i\}$ $b_s$: batch size, $b_i$: batch index, $c_s$: channel size, $c_{imag}$: channel containing the imaginary part values, $c_{real}$: channel containing the real values, $h_s$: height size, $h_i$: height index, $w_s$: width size, and $w_i$: width index.

The model may be trained/inferenced per single Tx antenna/Rx antenna channel, concatenated in a batch, thus giving the input $\tilde{H}_{p,AE}$ shape as: $[b_s, 2, 1, N_{sc}*N_{PRB}]$, in which $N_{sc}$ depends on a slot configuration and denotes the number of DMRS subcarriers per port in one physical resource block (PRB), e.g., $N_{sc}=6$ for the PRB configuration shown in FIGS. 3A and 3B. $N_{PRB}$ is a model parameter and denotes the number of PRBs (size of the spectrum chunk) that are derived to model input. $N_{PRB}$ may also be considered as the number of PRBs used per one inference, and may be $N_{PRB}=4,6,8,12, 16$. $b_s=N_F*N_{Tx}*N_{Rx}/(N_{sc}*N_{PRB})$ is the batch size.

The output of the decoder 403C, $\hat{H}_{p,AE}$, may have a dimension $[b_s, 2, 1, 2*N_{sc}*N_{PRB}]$, and it may contain the estimates that were achieved by the combined encoder 403A and decoder 403C. Due to the nature of convolutional operators, $\hat{H}_p$ is able to produce non-linear approximations of channels, given sufficient examples, thereby leading to enhanced approximations at least in some embodiments.

It is to be noted that here $b_s>1$ implies that there is more than one sample of $\tilde{H}_p$.

Figures 1, 5A:
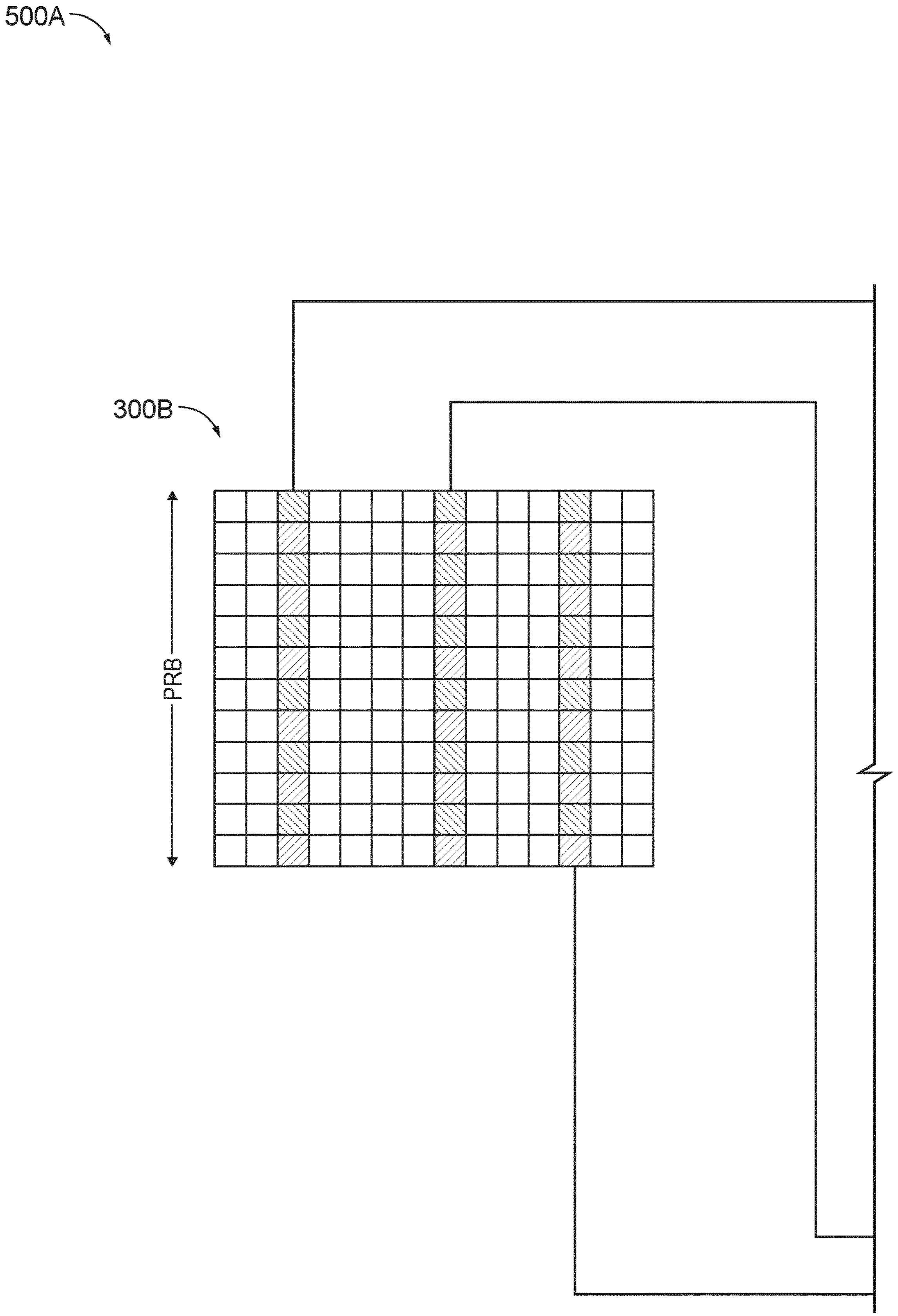
FIG. 5A shows an example embodiment of the subject matter described herein illustrating separate inference per demodulation reference symbol for a case with multiple demodulation reference symbols.
Figures 2, 5A:
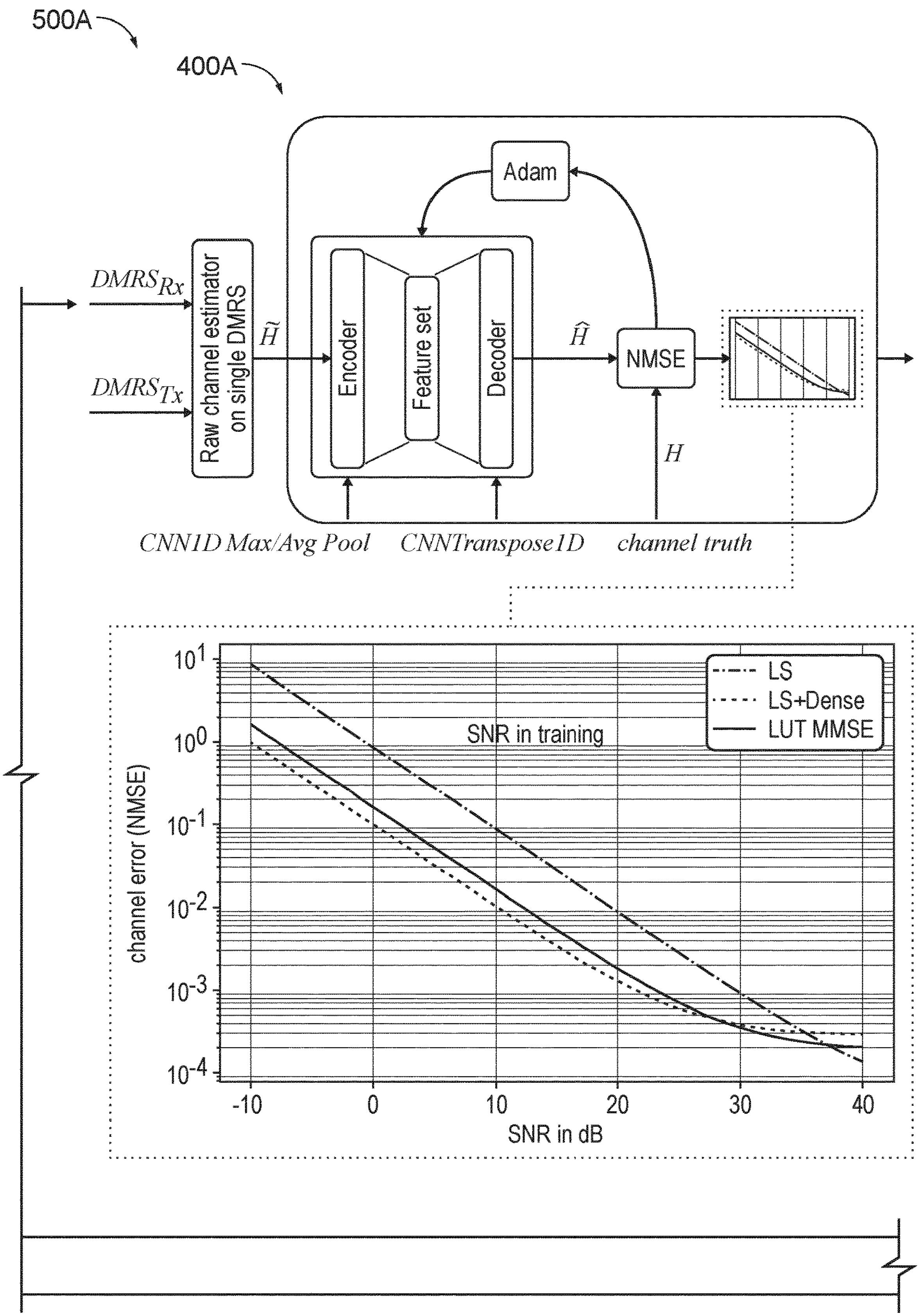
Figures 3, 5A:
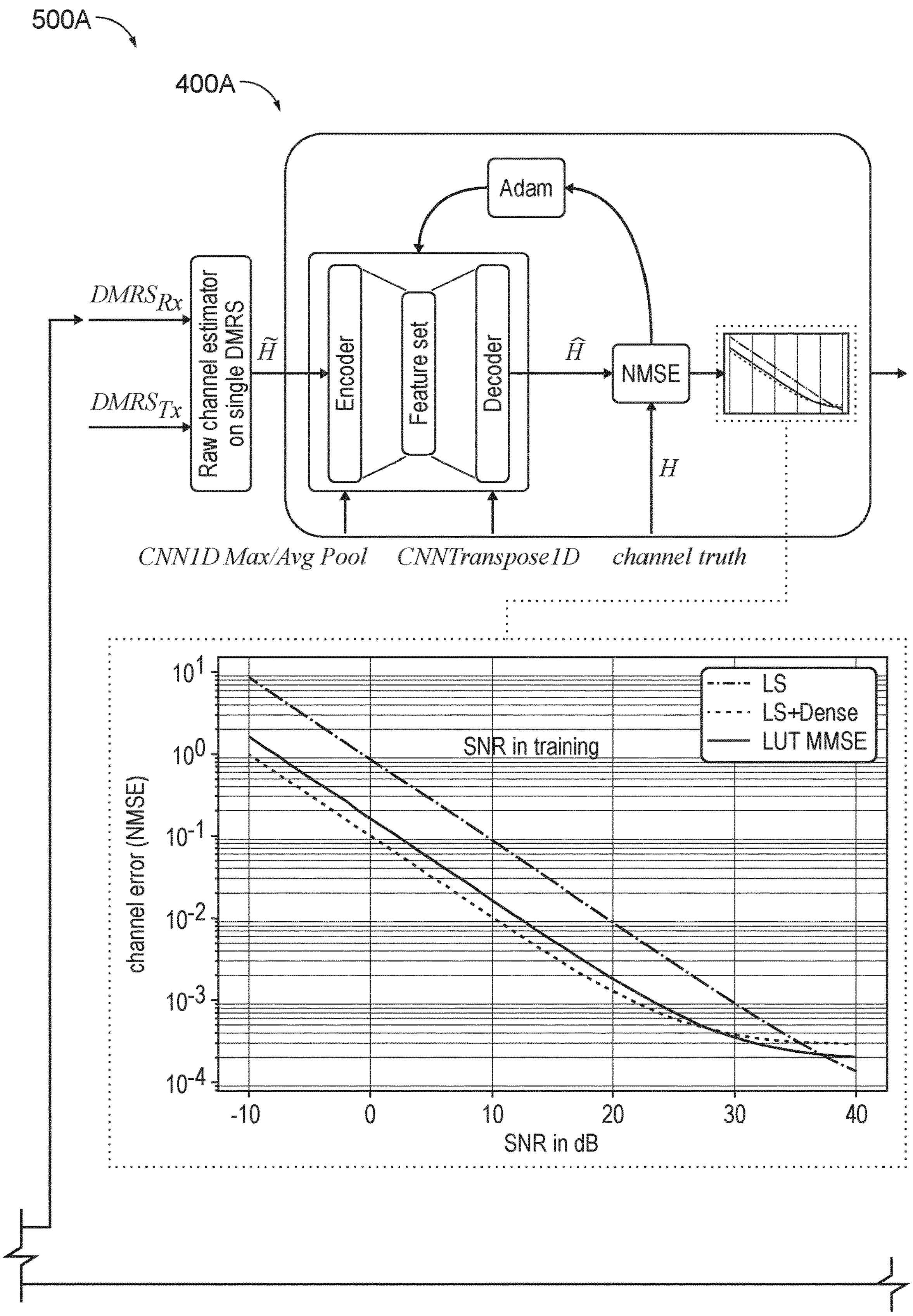
Figures 4, 5A:
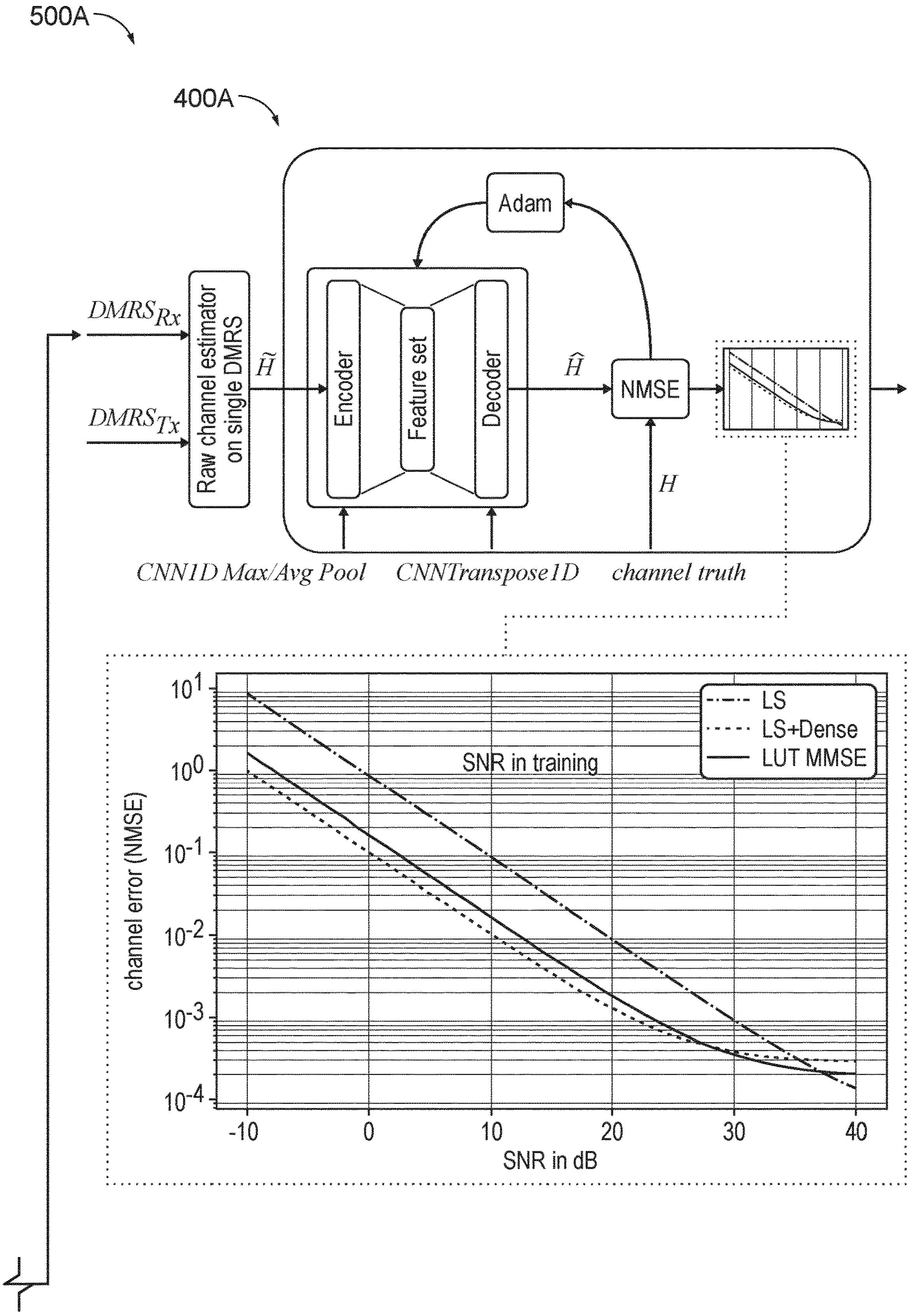
Figures 1, 5B:
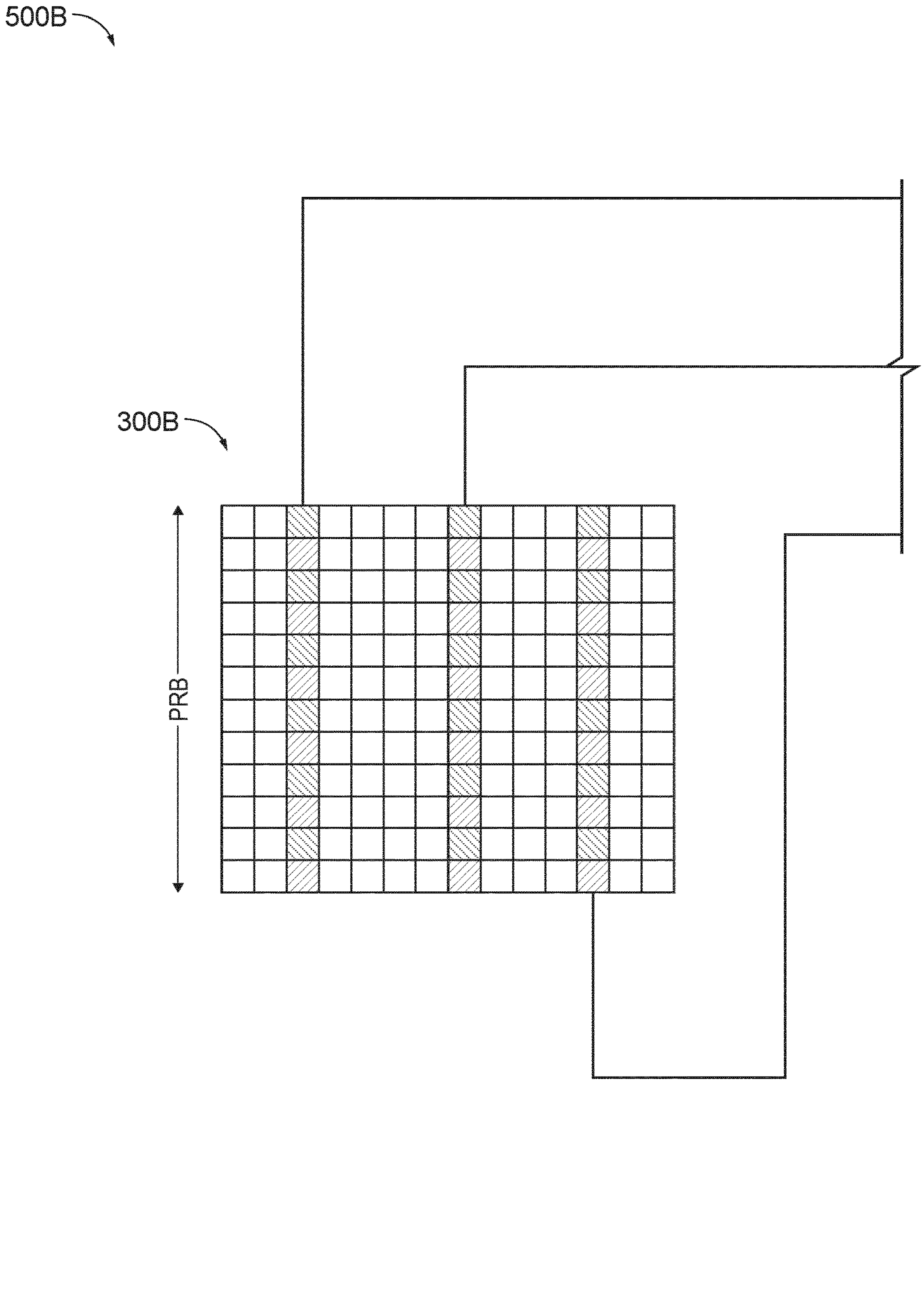
FIG. 5B shows an example embodiment of the subject matter described herein illustrating joint inference for all demodulation reference symbols in a slot for a case with multiple demodulation reference symbols.
Figures 2, 5B:
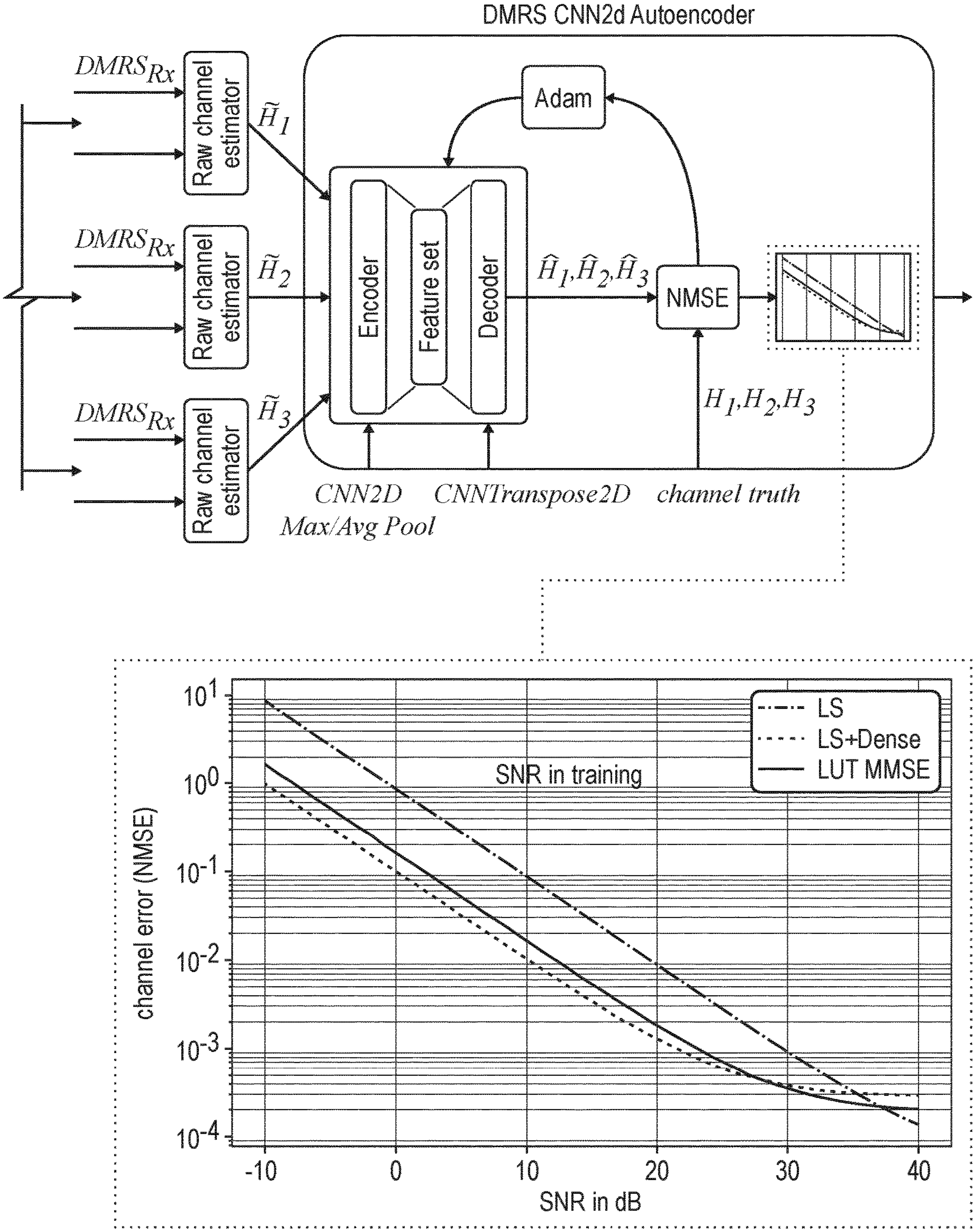

At least in some embodiments, separate inference may be performed for each DMRS of the multiple DMRSs. Alternatively, joint inference may be performed for each DMRS of the multiple DMRSs. In other words, at least in some embodiments, the trainable NN 403 may assume a slot configuration for a single DMRS, as shown in FIG. 3A, in which p=2. There are several ways to extend the model to multi-DMRS case, shown in FIG. 3B, in which p={2,7,11}. Two options are shown in diagram 500A of FIG. 5A and diagram 500B of FIG. 5B. The first option is to perform a separate inference for each DMRS in a slot, thus keeping the model size the same, as shown in FIG. 5A. The second option, shown in FIG. 5B, assumes joint inference for all DMRS symbols in a slot, thus exploiting the temporal information for better learning, but possibly requiring a larger model size.

The at least one memory 204 and the computer program code may be further configured to, with the at least one processor 202, cause the radio receiver device 200 to perform training the NN by performing dataset augmentation via statistical insertion of noise, additional passes of data, passing over same data multiple times and randomly picking samples, and/or zero padding.

In other words, the disclosure aims to provide a model that is able to learn features about the input structure. These features may help the model perform well on unknown sets of data. In order to achieve this, a training procedure, an example of which is illustrated by diagram 700 of FIG. 7, may be used. In this example, it is assumed that the system parameter $N_{PRB}=8$. This procedure relies on a series of concepts that aids the training and generalization of an ML model. These may include dataset augmentation. Here, dataset augmentation refers to a process of creating simulated data and including it in the training procedure.

In a first embodiment, dataset augmentation may be produced in two ways: augmentation through statistical insertion of noise, and/or augmentation through additional passes of data. The first form of augmentation may be performed when, with a probability of a random number generator, $P_{rng}=0.14$, noise is inserted to the input $\tilde{H}$, whereby the noise draws from three statistical distributions: Gaussian $\mu=0$, $\sigma=0.05$, Rayleigh $\mu=0$, $\sigma=0.05$, and uniform (max: −0.05, 0.05). Each batch b chosen during training is of a shape [64, 2, 1, 48]. This means that there are 64 randomly picked $\tilde{H}$ that are affected by this random noise insertion. The first third of this batch may then be modified by Rayleigh noise, the second third may be modified by Gaussian, and the final third may be modified by the uniformly generated noise set. In other words, in each training step, a random number generator produces one realization of a uniform random variable (rng) in a segment [0,1]. If this realization is smaller than $P_{rng}$, the one insertion of noise is executed. In this way, statistical insertion of augmented data may be performed $P_{rng}*100\%$ of time.

In a second embodiment, dataset augmentation may be produced by passing over the same data multiple times and randomly picking the samples, to allow the optimization process the opportunity to learn and search for a global minima. The loss function used on this process is described below.

Figure 6:
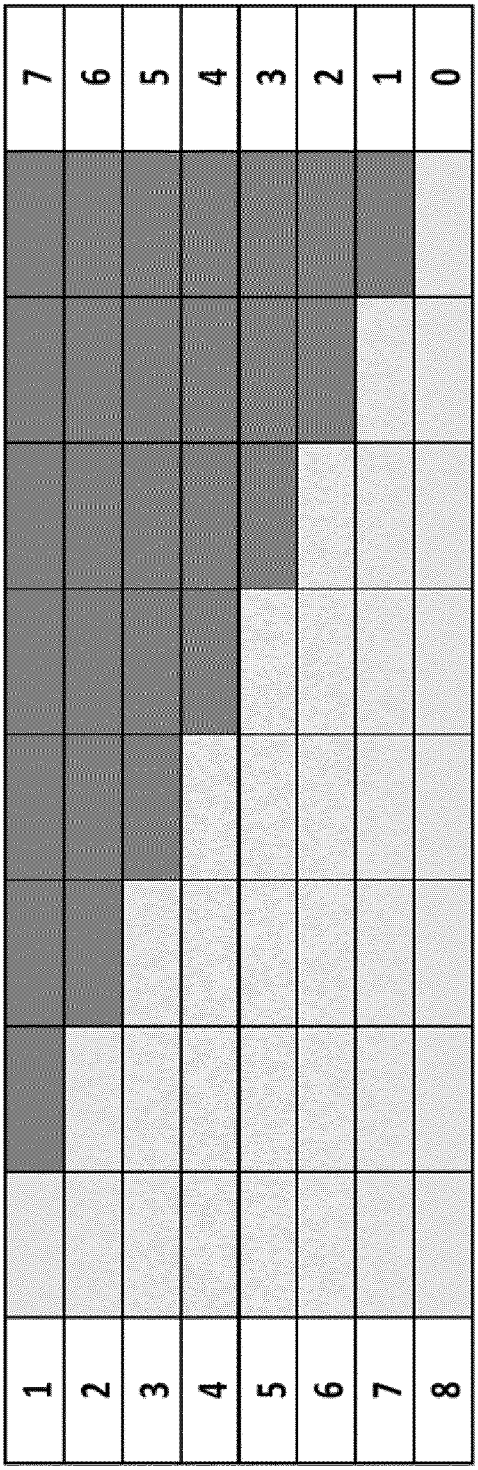
FIG. 6 shows an example embodiment of the subject matter described herein illustrating use of zero padding in training the neural network.

In a third embodiment, zero padding is used as a form of data augmentation and missing information handling. E.g., random imputation of zeros may be utilized, whereby zeros are added from the left-most PRB onwards, as illustrated in diagram 600 of FIG. 6, in which light gray blocks demonstrate available PRBs and dark grey illustrates zero padded blocks.

At least in some embodiments, the zero padding may allow the NN to learn how to deal with zeros in the data, and therefore with cases in which a number of PRBs are received that is smaller than ideal. This imputation of zeros may be done at random (uniformly), and so that a number of PRBs ranging between from $N_{PRB}-1$ and 0 are zeroed in the input set.

Figure 7:
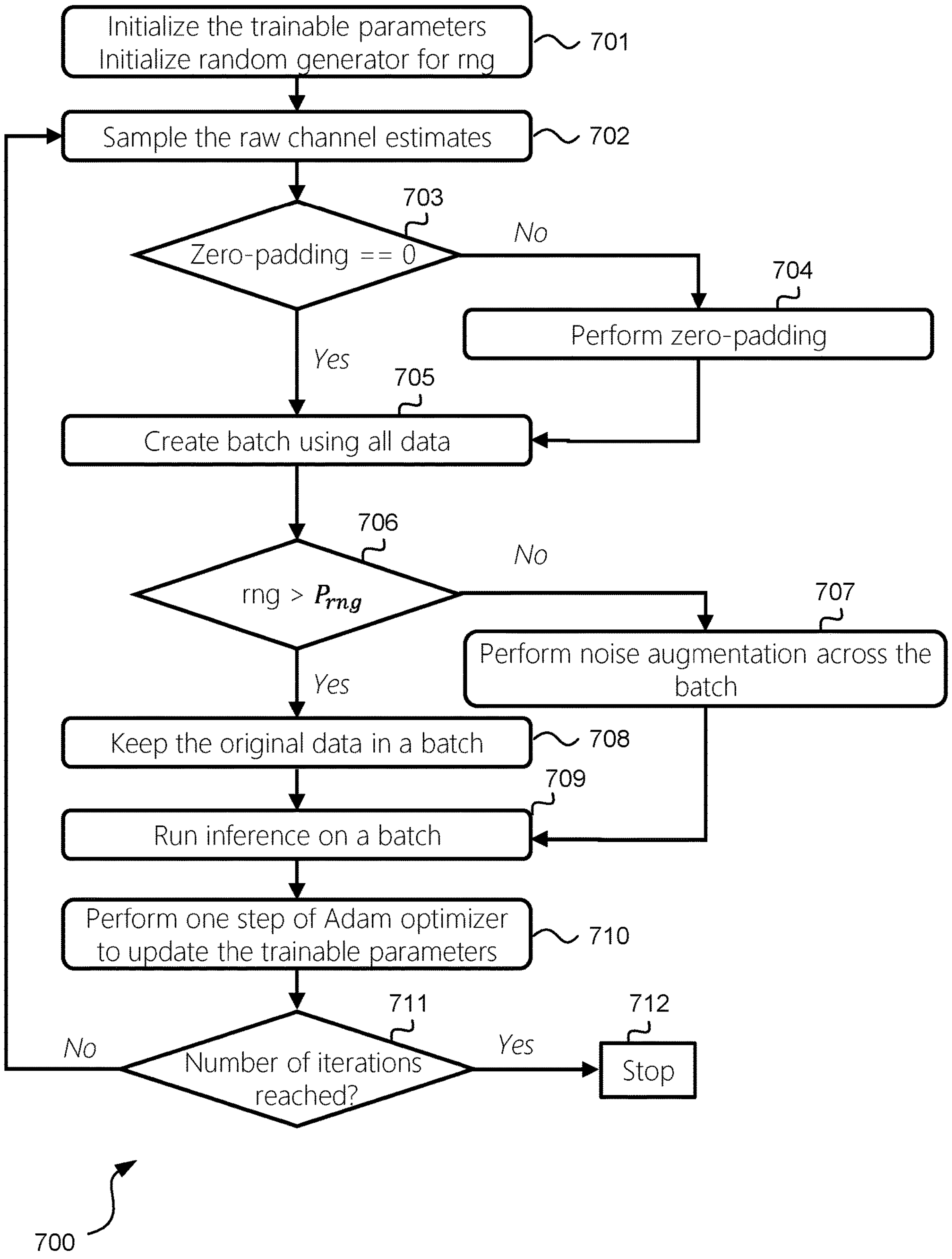
FIG. 7 shows an example embodiment of the subject matter described herein illustrating a training procedure of the neural network.

At operation 701 of diagram 700 of FIG. 7, trainable parameters are initialized, and a random number generator is initialized. At operation 702, raw channel estimates are sampled. At operation 703, it is checked whether zero padding equals 0. If not, zero padding is performed at operation 704. If yes, the training procedure proceeds to operation 705 in which a batch is created using all the data. At operation 706, it is checked whether rng>$P_{rng}$. If not, noise augmentation is performed across the batch at operation 707. If yes, the training procedure proceeds to operation 708 in which the original data is kept in a batch. At operation 709, inference is run on a batch. At operation 710, one step of the Adam optimizer 406 is performed to update the trainable parameters. At operation 711, it is checked whether the number of iterations has been reached. If yes, the training procedure stops, operation 712. If not, the training procedure returns to operation 702.

At least in some embodiments, the training of the NN may further comprise a regularization of a loss function. Here, regularization refers to a concept that assumes penalizing of a training metric in order to not overfit a training set. For example, the loss function may be a composition of terms. E.g., Huber Loss (denoted $\mathcal{L}$ here) of PyTorch (https://pytorch.org), may be used as a starting point. In addition, the following definitions may be produced:

$$\mathcal{L}_{NMSE,real}(H_p, \hat{H}_p) = \frac{\mathcal{L}(H_{p,real}, \hat{H}_{p,real})}{H_P}$$

$$\mathcal{L}_{NMSE,imag}(H_p, \hat{H}_p) = \frac{\mathcal{L}(H_{p,imag}, \hat{H}_{p,imag})}{H_P}$$

in which:

$$H_P = \sum_{i=0}^{i=b_s-1} \frac{1}{b_s} \|H_i\|_2^2$$

and real implies that $c_i$=0, and imag implies $c_i$=1. For example:

$$H_{real} = H[:, c_i = 0, :, :],\ H_{imag} = H[:, c_i = 1, :, :]$$

The final resulting criterion may be a composition of the previous terms and a weighting term α=1.20:

$$\mathcal{L}_{NMSE}(H_p, \hat{H}_p) = \mathcal{L}_{NMSE,Real}(H_p, \hat{H}_p) + \alpha\mathcal{L}_{NMSE,imag}(H_p, \hat{H}_p)$$

At least in some embodiments, the training of the NN may further comprise a statistical momentum-based optimization. Here, statistical momentum-based optimization refers to methods that leverage linear combinations of weights which aim to keep track of how fast a gradient descent is evolving over a number of iteration steps. A statistical component is then applied to an update step to allow further feasibility in high-dimensional problems, such as machine learning problems.

The statistical momentum-based optimization refers to the method presented in [6], where fundamentals are explored, and [7] where the concept applied to deep learning is exposed. During the training phase, the decoder 403C and the encoder 403A are separate. This means that $\mathcal{L}_{NMSE}$(H, Ĥ) is backpropagated through each layer of biases and weights, for each separate model (decoder 403C and encoder 403A). At least in some embodiments, this may allow independent evaluation of what the encoder 403A and the decoder 403C are learning, as well as allow the encoder 403A to learn from errors produced by the decoder 403C.

The at least one memory 204 and the computer program code may be further configured to, with the at least one processor 202, cause the radio receiver device 200 to perform providing additional information available in the radio receiver device 200, such as an SNR of the raw channel estimate, and/or an inverse fast Fourier transform (IFFT) of the raw channel estimate to the NN. This may improve the learning performance of the NN.

Figure 8:
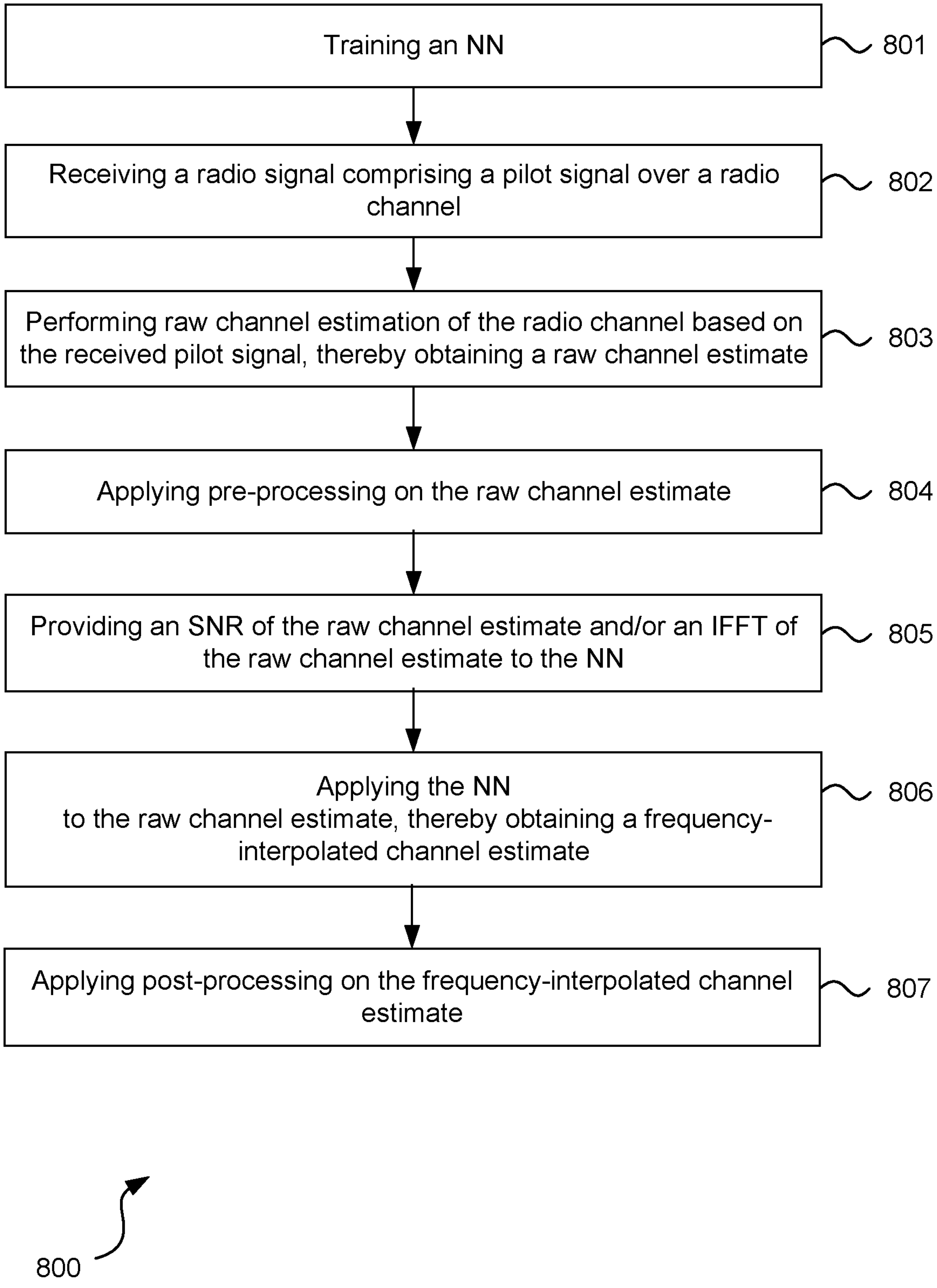
FIG. 8 shows an example embodiment of the subject matter described herein illustrating a method.

FIG. 8 illustrates an example flow chart of a method 800, in accordance with an example embodiment.

At optional operation 801, the radio receiver device 200 may train the NN by performing dataset augmentation via statistical insertion of noise, additional passes of data, passing over same data multiple times and randomly picking samples, and/or zero padding.

At operation 802, the radio receiver device 200 receives a radio signal comprising a pilot signal, over the radio channel 120.

At operation 803, the radio receiver device 200 performs raw channel estimation of the radio channel 120 based on the received pilot signal, thereby obtaining a raw channel estimate.

At optional operation 804, the radio receiver device 200 may apply pre-processing on the raw channel estimate. The pre-processing is described in more detail above in connection with FIG. 2, for example.

At optional operation 805, the radio receiver device 200 may provide an SNR of the raw channel estimate or an IFFT of the raw channel estimate to the NN.

At operation 806, the radio receiver device 200 processes the raw channel estimate. As discussed above in more detail, the processing of the raw channel estimate comprises applying an NN to the raw channel estimate. The NN comprises at least one fully connected layer and at least one convolutional layer. The NN is executable to encode the raw channel estimate by mapping the raw channel estimate into an alternate domain, thereby obtaining an encoded channel estimate. The NN is further executable to decode the encoded channel estimate by mapping the encoded channel estimate to a frequency-interpolated channel estimate.

At optional operation 807, the radio receiver device 200 may apply post-processing on the raw channel estimate. The post-processing is described in more detail above in connection with FIG. 2, for example.

The method 800 may be performed by the radio receiver device 200 of FIG. 2. The operations 801-807 can, for example, be performed by the at least one processor 202 and the at least one memory 204. Further features of the method 800 directly result from the functionalities and parameters of the radio receiver device 200, and thus are not repeated here. The method 800 can be performed by computer program(s).

At least some of the embodiments described herein may allow applying a neural network, comprising one or more fully connected layers and one or more convolutional neural network layers, to produce an output which minimizes a mean squared error between an ideal output for a given scenario and a realized output.

At least some of the embodiments described herein may allow a trainable smoother of raw channel estimates that may have at least the following advantages:

improving performance in low-SNR region, improving performance in high frequency-selective scenarios, generalizes well for different channel models, without giving the explicit information about the channel statistics, and implementation scales well for various MIMO configurations.

At least some of the embodiments described herein may allow enhanced performance in high frequency selective channels and edge user situations.

The radio receiver device 200 may comprise means for performing at least one method described herein. In one example, the means may comprise the at least one processor 202, and the at least one memory 204 including program code configured to, when executed by the at least one processor, cause the radio receiver device 200 to perform the method.

The functionality described herein can be performed, at least in part, by one or more computer program product components such as software components. According to an embodiment, the radio receiver device 200 may comprise a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A radio receiver device comprising:

at least one processor; and at least one memory including computer program code;

the at least one memory and the computer program code configured to, with the at least one processor, cause the radio receiver device at least to perform:

receiving a radio signal comprising a pilot signal, over a radio channel;

performing raw channel estimation of the radio channel based on the received pilot signal, thereby obtaining a raw channel estimate; and processing the raw channel estimate, wherein the processing of the raw channel estimate comprises applying a neural network, NN, to the raw channel estimate, the NN comprising at least one fully connected layer and at least one convolutional layer, and the NN being executable to:

encode the raw channel estimate by mapping the raw channel estimate into an alternate domain, thereby obtaining an encoded channel estimate; and decode the encoded channel estimate by mapping the encoded channel estimate to a frequency-interpolated channel estimate.

2. The radio receiver device according to claim 1, wherein the at least one memory and the computer program code are further configured to, with the at least one processor, cause the radio receiver device to perform applying pre-processing on the raw channel estimate before the applying of the NN, the pre-processing comprising at least one of:

mapping a three-dimensional complex-valued raw channel estimate to a four-dimensional real-valued raw channel estimate by extracting respective real and imaginary components;

separating the four-dimensional real-valued raw channel estimate into real-valued raw channel estimates for each single transmit antenna and single receive antenna pair; or reshaping the separated real-valued raw channel estimates to an input dimension of the NN.

3. The radio receiver device according to claim 1, wherein the at least one memory and the computer program code are further configured to, with the at least one processor, cause the radio receiver device to perform applying post-processing on the frequency-interpolated channel estimate after the applying of the NN, the post-processing comprising at least one of:

reshaping an output dimension of the NN to real-valued frequency-interpolated channel estimates for each single transmit antenna and single receive antenna pair;

concatenating the real-valued frequency-interpolated channel estimates for each single transmit antenna and single receive antenna pair to a four-dimensional real-valued frequency-interpolated channel estimate; or mapping the four-dimensional real-valued frequency-interpolated channel estimate to a three-dimensional complex-valued frequency-interpolated channel estimate.

4. The radio receiver device according to claim 1, wherein the pilot signal comprises a single demodulation reference signal, DMRS, in a slot.

5. The radio receiver device according to claim 1, wherein the pilot signal comprises multiple DMRSs in a slot.

6. The radio receiver device according to claim 5, wherein separate inference is performed for each DMRS of the multiple DMRSs.

7. The radio receiver device according to claim 5, wherein joint inference is performed for each DMRS of the multiple DMRSs.

8. The radio receiver device according to claim 1, wherein the at least one memory and the computer program code are further configured to, with the at least one processor, cause the radio receiver device to perform training the NN by performing dataset augmentation via at least one of: statistical insertion of noise, additional passes of data, passing over same data multiple times and randomly picking samples, or zero padding.

9. The radio receiver device according to claim 8, wherein the training of the NN further comprises a regularization of a loss function.

10. The radio receiver device according to claim 8, wherein the training of the NN further comprises a statistical momentum-based optimization.

11. The radio receiver device according to claim 1, wherein the at least one memory (204) and the computer program code are further configured to, with the at least one processor (202), cause the radio receiver device to perform providing at least one of a signal-to-noise ratio, SNR, of the raw channel estimate or an inverse fast Fourier transform, IFFT, of the raw channel estimate to the NN.

12. The radio receiver device according to claim 1, wherein the radio channel comprises a physical downlink shared channel, PDSCH, a physical uplink shared channel, PUSCH, a physical downlink control channel, PDCCH, or a physical broadcast channel, PBCH.

13. The radio receiver device according to claim 1, wherein the received radio signal comprises an orthogonal frequency-division multiplexing, OFDM, radio signal.

14. The radio receiver device according to claim 1, wherein the radio receiver device comprises a multiple-input and multiple-output, MIMO, capable radio receiver device.

15. A method, comprising:

receiving, at a radio receiver device, a radio signal comprising a pilot signal, over a radio channel;

performing, by the radio receiver device, raw channel estimation of the radio channel based on the received pilot signal, thereby obtaining a raw channel estimate; and processing, by the radio receiver device, the raw channel estimate, wherein the processing of the raw channel estimate comprises applying, by the radio receiver device, a neural network, NN, to the raw channel estimate, the NN comprising at least one fully connected layer and at least one convolutional layer, and the NN being executable to:

encode the raw channel estimate by mapping the raw channel estimate into an alternate domain, thereby obtaining an encoded channel estimate; and decode the encoded channel estimate by mapping the encoded channel estimate to a frequency-interpolated channel estimate.

16. A non-transitory computer readable medium comprising instructions for for causing a radio receiver device to perform at least receive a radio signal comprising a pilot signal, over a radio channel; perform raw channel estimation of the radio channel based on the received pilot signal, thereby obtaining a raw channel estimate; and process the raw channel estimate, wherein the processing of the raw channel estimate comprises applying a neural network, NN, to the raw channel estimate, the NN comprising at least one fully connected layer and at least one convolutional layer, and the NN being executable to: encode the raw channel estimate by mapping the raw channel estimate into an alternate domain, thereby obtaining an encoded channel estimate; and decode the encoded channel estimate by mapping the encoded channel estimate to a frequency-interpolated channel estimate.

17. The method according to claim 15, further comprising at least one of:

mapping a three-dimensional complex-valued raw channel estimate to a four-dimensional real-valued raw channel estimate by extracting respective real and imaginary components;

separating the four-dimensional real-valued raw channel estimate into real-valued raw channel estimates for each single transmit antenna and single receive antenna pair; or reshaping the separated real-valued raw channel estimates to an input dimension of the NN.

18. The method according to claim 15, further comprising applying post-processing on the frequency-interpolated channel estimate after the applying of the NN, the post-processing comprising at least one of:

reshaping an output dimension of the NN to real-valued frequency-interpolated channel estimates for each single transmit antenna and single receive antenna pair;

concatenating the real-valued frequency-interpolated channel estimates for each single transmit antenna and single receive antenna pair to a four-dimensional real-valued frequency-interpolated channel estimate; or mapping the four-dimensional real-valued frequency-interpolated channel estimate to a three-dimensional complex-valued frequency-interpolated channel estimate.

19. The non-transitory computer readable medium according to claim 16, wherein the instructions cause the radio receiver device to perform at least one of:

map a three-dimensional complex-valued raw channel estimate to a four-dimensional real-valued raw channel estimate by extracting respective real and imaginary components;

separate the four-dimensional real-valued raw channel estimate into real-valued raw channel estimates for each single transmit antenna and single receive antenna pair; or reshape the separated real-valued raw channel estimates to an input dimension of the NN.

20. The non-transitory computer readable medium according to claim 16, wherein the instructions cause the radio receiver device to apply post-processing on the frequency-interpolated channel estimate after the applying of the NN, the post-processing comprising at least one of:

reshape an output dimension of the NN to real-valued frequency-interpolated channel estimates for each single transmit antenna and single receive antenna pair;

concatenate the real-valued frequency-interpolated channel estimates for each single transmit antenna and single receive antenna pair to a four-dimensional real-valued frequency-interpolated channel estimate; or map the four-dimensional real-valued frequency-interpolated channel estimate to a three-dimensional complex-valued frequency-interpolated channel estimate.

* * * * *